United States Patent
Ito

(10) Patent No.: US 11,431,860 B2
(45) Date of Patent: Aug. 30, 2022

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Keisuke Ito, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/884,193

(22) Filed: May 27, 2020

(65) Prior Publication Data

US 2020/0382661 A1 Dec. 3, 2020

(30) Foreign Application Priority Data

Jun. 3, 2019 (JP) .............................. JP2019-103759

(51) Int. Cl.
*G06F 15/00* (2006.01)
*H04N 1/00* (2006.01)
*H04N 1/393* (2006.01)

(52) U.S. Cl.
CPC ..... *H04N 1/00408* (2013.01); *H04N 1/00005* (2013.01); *H04N 1/00076* (2013.01); *H04N 1/00244* (2013.01); *H04N 1/393* (2013.01); *H04N 2201/0094* (2013.01)

(58) Field of Classification Search
CPC ........... H04N 1/00408; H04N 1/00005; H04N 1/00076; H04N 1/00244; H04N 1/393; H04N 2201/0094

USPC .......................................................... 358/1.2
See application file for complete search history.

(56) References Cited

U.S. PATENT DOCUMENTS

| | | |
|---|---|---|
| 5,617,138 A | 4/1997 | Ito et al. |
| 5,930,528 A | 7/1999 | Ito et al. |
| 6,147,704 A | 11/2000 | Ito et al. |
| 6,529,644 B2 | 3/2003 | Ito et al. |
| 6,809,757 B1 | 10/2004 | Ito et al. |
| 10,091,396 B2 * | 10/2018 | Hattori ............... H04N 1/00469 |
| 2019/0045079 A1 * | 2/2019 | Tanaka ...................... G06T 3/40 |
| 2019/0124227 A1 * | 4/2019 | Tabata ............... H04N 1/00867 |
| 2019/0238710 A1 * | 8/2019 | Arifuku ............. H04N 1/00453 |

FOREIGN PATENT DOCUMENTS

JP 2017-130811 A 7/2017

* cited by examiner

*Primary Examiner* — Mark R Milia
(74) *Attorney, Agent, or Firm* — Venable LLP

(57) ABSTRACT

At the time of registering an image in units of documents, which is obtained by performing multi-cropping processing for a scanned image, and value information extracted from each image in a database in association with each other, there is a case where it is not possible to extract the value information successfully because of an overlap between documents during a scan. In a case where this fact is noticed after registration, it becomes necessary for a user to perform the entire work from the beginning. In a case where there is a possibility that the value information is hidden by an overlap between documents during a scan or the like, a display is produced for prompting a user to scan the document again.

9 Claims, 26 Drawing Sheets

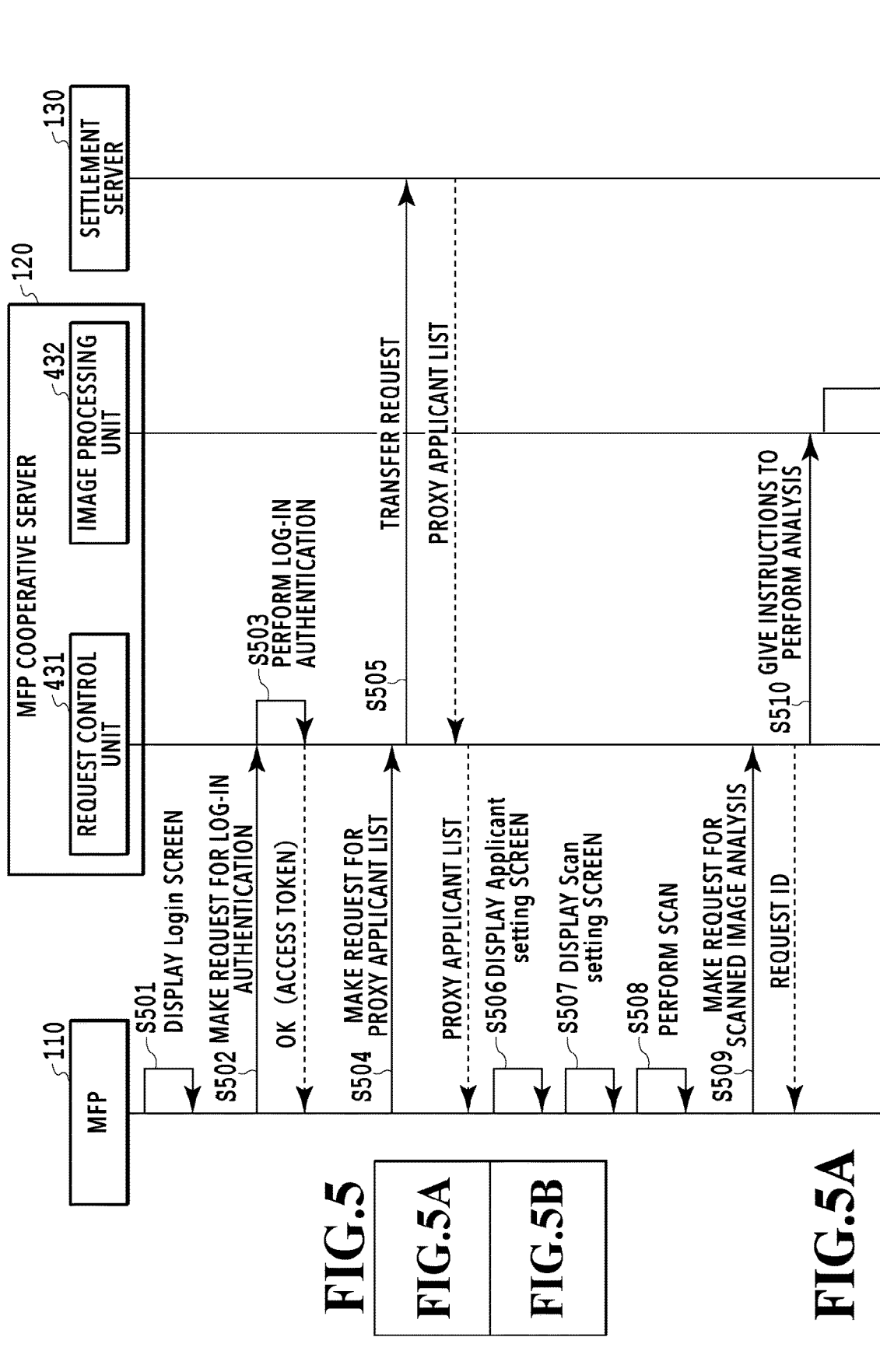

```
{
    "Delegators":[
        {
          "UserID" :"UserB@xxxxx.com",
          "UserName":"UserB"
        },
        {
          "UserID" :"UserC@xxxxx.com",
          "UserName":"UserC"
        },
        {
          "UserID" :"UserD@xxxxx.com",
          "UserName":"UserD"
        }
    ]
}
```

FIG.8

Applicant setting ~900

Select your name in a case where you perform application, or select the user name of a proxy applicant in a case of proxy application.

User name: | UserB ▼ | ~902

Next ~901

FIG.9

```
{
    "JobID":"12345678"
}
```

FIG.12A

```
{
    "Status":"processing"
}
```

FIG.12B

```
{
    "Status":"error"
    "message":"value extraction failed"
}
```

FIG.12C

```
}
        "Status" : "completed",
        "Images" : [
            {
                "ImageID" : "image0001",
                "ContentsType" : "Receipt",
                "ReceiptData" : [
                    {
                        "Date" : "20180313",
                        "Amount" : "10000"
                    }
                ],
                "Points" : [2049, 361, 4665, 241, 4793, 1345, 2169, 1465]
            },
            {
                "ImageID" : "image0002",
                "ContentsType" : "Receipt",
                "ReceiptData" : [
                    {
                        "Date" : "20180311",
                        "Amount" : "2000"
                    }
                ],
                "Points" : [2921, 1825, 3977, 1897, 3857, 3353, 2825, 3265]
            },
            {
                "ImageID" : "image0003",
                "ContentsType" : "Receipt",
                "ReceiptData" : [
                    {
                        "Date" : "20180312",
                        "Amount" : "950"
                    }
                ],
                "Points" : [777, 337, 1721, 329, 1711, 2057, 769, 2049]
            }
        ]
}
```

FIG.15

```
{
    "ExpenseTypes": [
        {
            "ID": "0001",
            "Name": "Hotel"
        },
        {
            "ID": "0002",
            "Name": "Car Rental"
        },
        {
            "ID": "0003",
            "Name": "Fuel"
        },
        {
            "ID": "0004",
            "Name": "Parking"
        },
        {
            "ID": "0005",
            "Name": "Taxi"
        },
        {
            "ID": "0007",
            "Name": "Breakfast"
        },
        {
            "ID": "0008",
            "Name": "Lunch"
        },
        {
            "ID": "0009",
            "Name": "Dinner"
        },
        {
            "ID": "0010",
            "Name": "Business Meals"
        }
    ]
}
```

FIG.16

Metadata setting ~1700

~1710

RECEIPT
Vehicle No.1234
March 11, 2018
Amount
¥2,000

Thank you for your ride.

○○Transportation Inc.
TEL:000-000-0000

Expense Type: | Taxi ▼ | ~1704
Transaction Date: | 2018/3/11 | ~1705
Amount: | 2000 | ~1706
Location: | Tokyo | ~1707

[Back] ~1703  [Next] ~1702  [Transmit] ~1701

FIG.17

```
{
    "ExpenseTypeID":"0005",
    "TransactionDate":"20180311",
    "Amount":"2000",
    "Location":"Tokyo"
}
```

FIG.18

IMAGE PROCESSING APPARATUS, IMAGE PROCESSING METHOD AND STORAGE MEDIUM

BACKGROUND OF THE INVENTION

Field of the Invention

The present disclosure relates to multi-cropping processing of a scanned image.

Description of the Related Art

At present, an expense settlement system exists, in which an image in units of receipts (an image corresponding to a receipt in a one-to-one manner) is acquired by performing multi-cropping processing on a cloud service for an image obtained by scanning a plurality of receipts en bloc, and a specific character string, such as date and amount, is extracted therefrom and registered in a database in association with each image. The specific character string registered in association with an image is also called "value information" and it is possible for a user to check already-registered value information by accessing the database. Then, in a case where value information is registered erroneously, it is also possible to correct the value to a correct value by referring to the image associated with the value information.

At the time of scanning a plurality of documents at the same time with a scanner device, there is a case where the document placed on a document table moves by a document table cover being lowered, and therefore, the documents overlap each other. In a case where the documents overlap each other, a correct image in units of documents is not obtained by the multi-cropping processing, and therefore, it is necessary for a user to place the documents again and perform a scan anew. For the problem such as this, a technique has been proposed that automatically divides, in a case where there exists an image that is read in a state where documents overlap each other among images cropped from a scanned image by the multi-cropping processing, the image into images in units of documents (Japanese Patent Laid-Open No. 2017-130811).

Here, even though there is an overlap between placed receipts, in a case where the important portion relating to the date or the amount is not hidden, it is possible to extract the value information from each image obtained by division by using the technique of Japanese Patent Laid-Open No. 2017-130811 described above. Further, it is also possible to correct the error of the value information associated with the already-registered image by accessing the database and referring to the image. However, in a case where the important portion is hidden by an overlap between documents, it is not possible to extract the necessary value information from the obtained image even by dividing the scanned image by applying the technique of Japanese Patent Laid-Open No. 2017-130811 described above. Further, in this case, it is not possible to correct the value of the value information associated with the already-registered image by accessing the database and referring to the image. In such a situation, it is necessary for a user having checked insufficiency of the registered contents on the database to go to the location at which the scanner device is installed, and set the documents and perform a scan again. Such work will require time and effort of the user and impose a heavy burden on the user.

SUMMARY OF THE INVENTION

The image processing apparatus according to the present disclosure includes: at least one memory that stores a program; and at least one processor that executes the program to perform: giving instructions to perform analysis processing to obtain a document image corresponding to each of a plurality of documents from a scanned image generated by scanning the plurality of documents placed on a document table and, extract a specific character string from each document image; and displaying a user interface screen on a display unit, which prompts a user to perform the scanning again for a document corresponding to a specific document image among each of the document images based on results of the analysis processing, and the specific document image is a document image with a possibility that extraction of the specific character string has failed.

Further features of the present invention will become apparent from the following description of exemplary embodiments with reference to the attached drawings.

BRIEF DESCRIPTION OF THE DRAWINGS

FIG. 8 is a diagram showing an example of a proxy applicant list;

FIG. 9 is a diagram showing an example of an Applicant setting screen;

FIG. 12A is a diagram showing an example of a request ID, FIG. 12B is a diagram showing an example of a response indicating that processing is in progress, and FIG. 12C is a diagram showing an example of a response indicating an error;

FIG. 15 is a diagram showing an example of a response indicating that processing is completed;

FIG. 16 is a diagram showing an example of metadata item information;

FIG. 17 is a diagram showing an example of a Metadata setting screen;

FIG. 18 is a diagram showing an example of data that is transmitted along with a metadata setting request;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
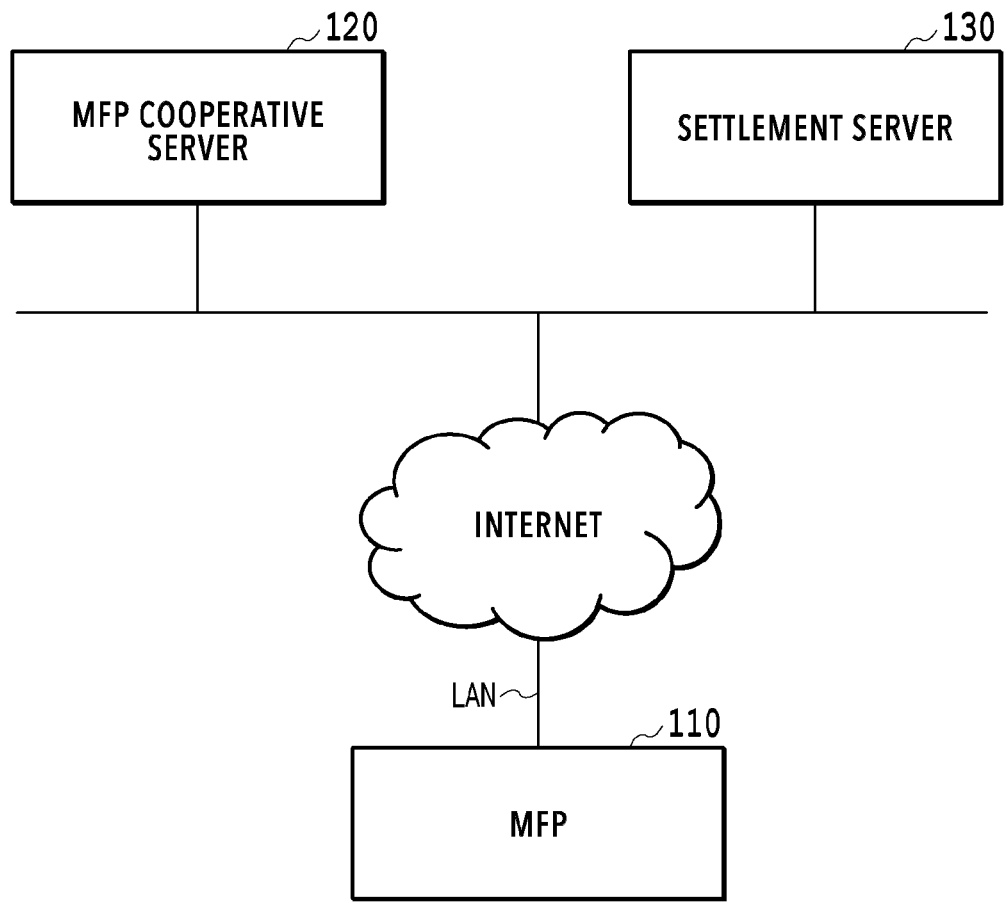
FIG. 1 is a diagram showing an entire configuration of an image processing system.

FIG. 1 is a diagram showing the entire configuration of an image processing system 100 according to the present embodiment. The image processing system 100 includes an MFP (Multi Function Peripheral) 110 and server apparatuses 120 and 130 providing cloud services on the internet. The MFP 110 is connected with the server apparatuses 120 and 130 so as to be capable of communication via the internet.

The MFP 110 is an example of an information processing apparatus having the scan function. The MFP 110 is a multi function peripheral having a plurality of functions, such as the print function and the BOX save function, in addition to the scan function. Both the server apparatuses 120 and 130 are each an example of an information processing apparatus providing cloud services. The server apparatus 120 of the present embodiment provides cloud services to perform predetermined image analysis processing for scanned image data received from the MFP 110, transfer a request from the MFP 110 to the server apparatus 130 providing other services, and so on. In the following, the cloud service provided by the server apparatus 120 is called "MFP cooperative service". The server apparatus 130 provides a cloud service (hereinafter, called "expense settlement service") for performing expense settlement efficiently. In the expense settlement service, in a case where receipts are saved and managed by associating the images of the receipts with additional information (metadata), such as dates of the receipts, or a person other than the person who has received a receipt performs the computerization work of the receipt, it is possible to set a person (proxy applicant) who performs the work, and so on. Hereinafter, the server apparatus 120 that provides the MFP cooperative service is called "MFP cooperative server" and the server apparatus 130 that provides the expense settlement service is called "settlement server".

The configuration of the image processing system 100 shown in FIG. 1 is an example and the configuration is not limited to this. For example, the MFP 110 may also have the function of the MFP cooperative server 120. Further, the MFP cooperative server 120 may be connected with the MFP 110 via a LAN (Local Area Network) in place of the internet. Furthermore, in the present embodiment, explanation is given by taking a receipt as an example of the computerization work-target document, but the target document is not limited to a receipt.

<Hardware Configuration of MFP>

Figure 2:
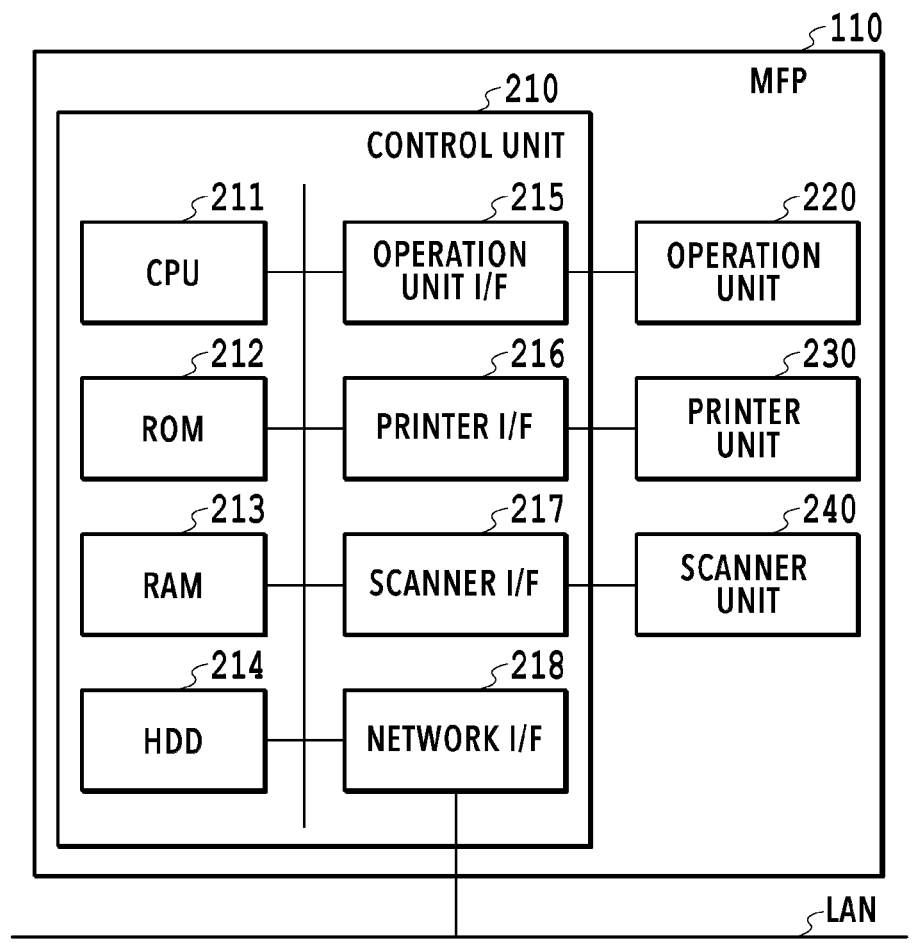
FIG. 2 is a block diagram showing a hardware configuration of an MFP.

FIG. 2 is a block diagram showing the hardware configuration of the MFP 110. The MFP 110 includes a control unit 210, an operation unit 220, a printer unit 230, and a scanner unit 240. The control unit 210 further includes each of units 211 to 218 below and controls the operation of the entire MFP 110. The CPU 211 reads a variety of control programs (programs corresponding to various functions shown in the software configuration diagram, to be described later) stored in the ROM 212 and executes the programs. The RAM 213 is used as a temporary storage area, such as a main memory and a work area, of the CPU 211. In the present embodiment, the one CPU 211 performs each piece of processing shown in the flowchart, to be described later, by using one memory (RAM 213 or HDD 214), but the present embodiment is not limited to this. For example, it may also be possible to perform each piece of processing by causing a plurality of CPUs and a plurality of RAMs or HDDs to cooperate with each other. The HDD 214 is a large-capacity storage unit configured to store image data and various programs. The operation unit I/F 215 is an interface that connects the operation unit 220 and the control unit 210. The operation unit 220 is provided with a touch panel and a hard key and receives operations/inputs/instructions by a user. The printer I/F 216 is an interface that connects the printer unit 230 and the control unit 210. Image data for printing is transferred from the control unit 210 to the printer unit 230 via the printer I/F 216 and printed on a printing medium, such as paper. The scanner I/F 217 is an interface that connects the scanner unit 240 and the control unit 210. The scanner unit 240 inputs an image (scanned image) obtained by scanning a document that is set on a document table or ADF (Auto Document Feeder), not shown schematically, to the control unit 210 via the scanner I/F 217. It is possible to print (copy and output) the scanned image data generated by the scanner unit 240 in the printer unit 230, save the data in the HDD 214, transmit the data to an external apparatus via a LAN, and so on. The network I/F 218 is an interface that connects the control unit 210 (MFP 110) to a LAN. The MFP 110 transmits scanned image data to the MFP cooperative server 120, receives various kinds of data from the MFP cooperative server 120, and so on, by using the network I/F 218. The hardware configuration of the MFP 110 explained above is an example and the hardware configuration may comprise another configuration as needed or may not have a part of the configuration.

<Hardware configuration of server apparatus>

Figure 3:
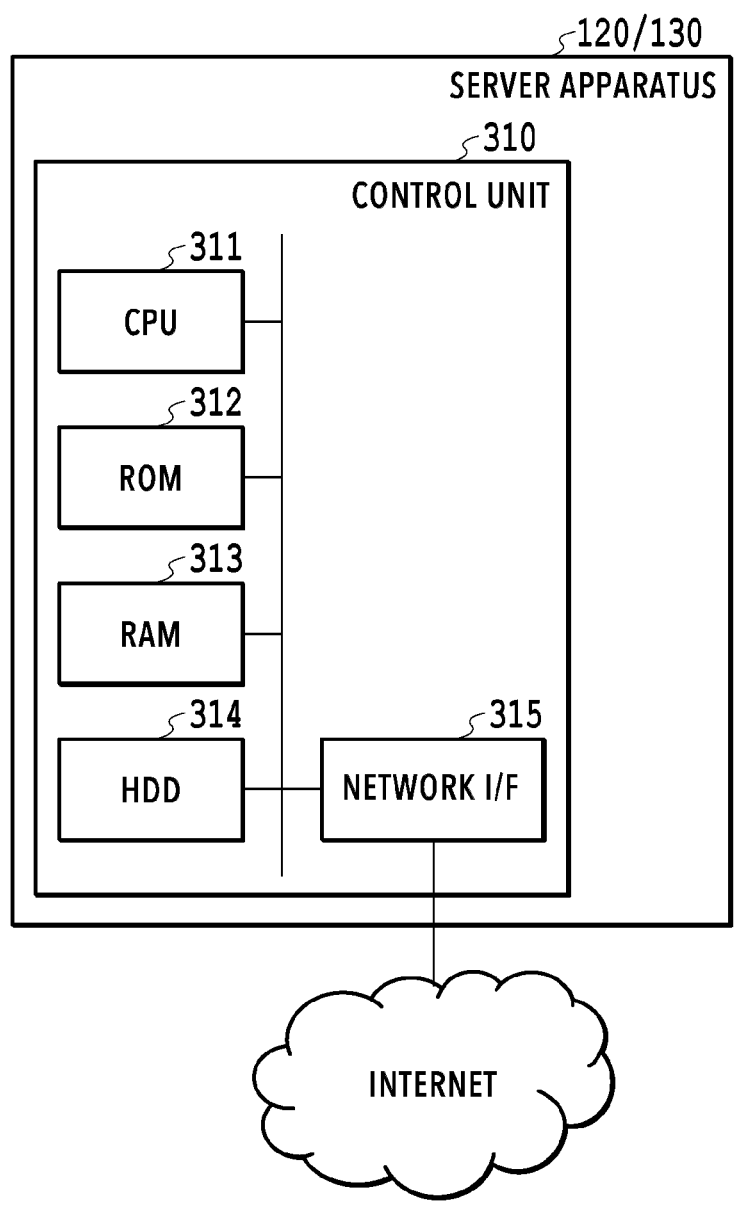
FIG. 3 is a block diagram showing a hardware configuration of an MFP cooperative server and a settlement server.

FIG. 3 is a block diagram showing the hardware configuration of the MFP cooperative server 120/the settlement server 130. The MFP cooperative server 120 and the settlement server 130 have the common hardware configuration and include a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects a control unit 310 to the internet. The MFP cooperative server 120 and the settlement server 130 receive requests for various kinds of processing from other apparatuses (MFP 110 and the like) via the network I/F 315 and return processing results in accordance with the requests.

<Software Configuration of Image Processing System>

Figure 4:
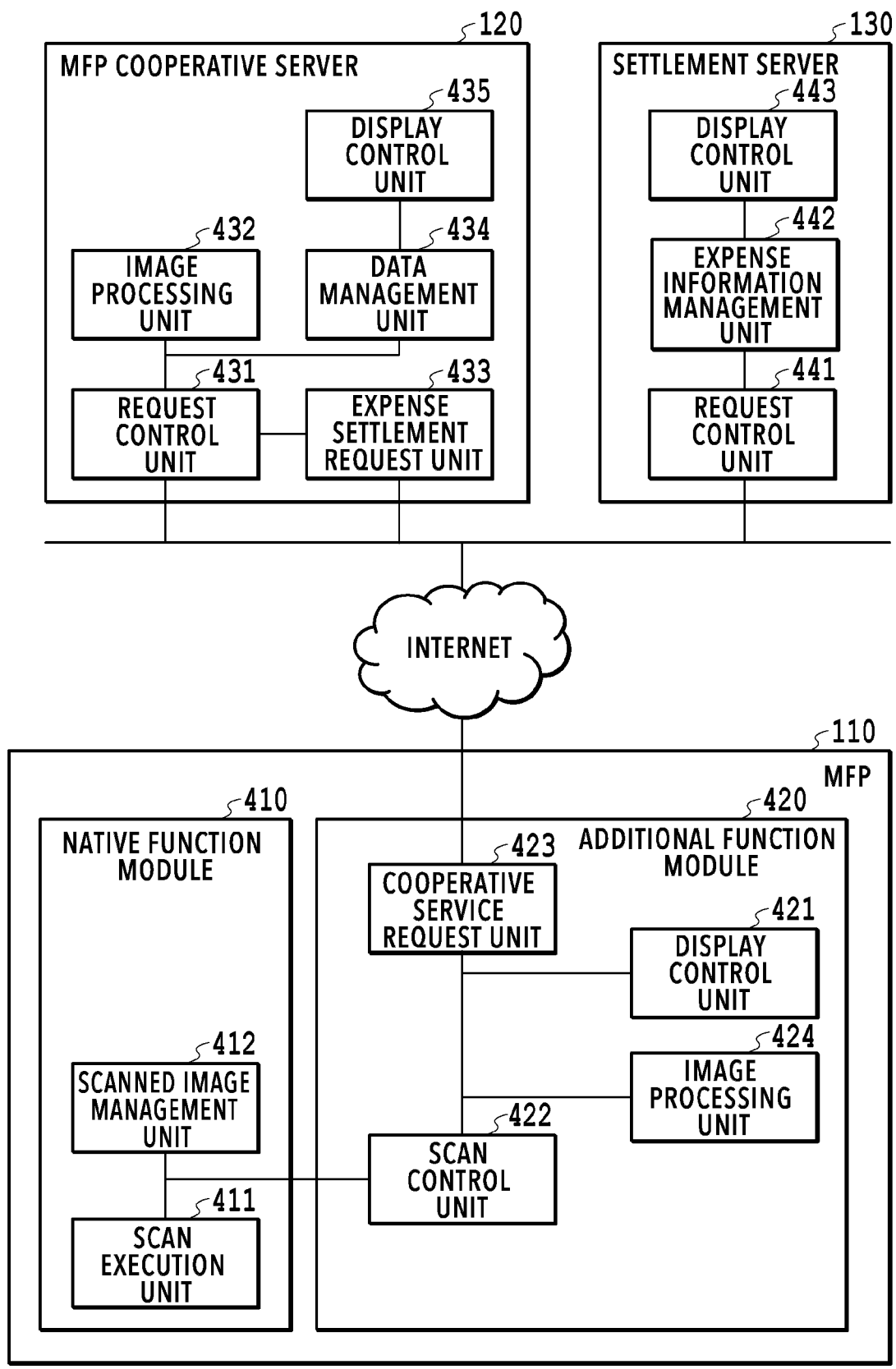
FIG. 4 is a block diagram showing a software configuration of the image processing system.

FIG. 4 is a block diagram showing the software configuration of the image processing system 100 according to the present embodiment. In the following, the software configuration corresponding to the role of each of the MFP 110, the MFP cooperative server 120, and the settlement server 130, which configure the image processing system 100, is explained in order. In the following, explanation is given by narrowing the various functions possessed by each apparatus to the functions relating to the processing to scan a receipt as a document and perform expense settlement.

<<Software Configuration of MFP>>

The function modules of the MFP 110 are roughly divided into a native function module 410 and an additional function module 420. While the native function module 410 is an application provided as a standard one in the MFP 110, the additional function module 420 is an application that is installed additionally in the MFP 110. The additional function module 420 is an application based on Java (registered trademark) and it is possible to easily implement the addition of a function to the MFP 110.

The native function module 410 has a scan execution unit 411 and a scanned image management unit 412. Further, the additional function module 420 has a display control unit 421, a scan control unit 422, a cooperative service request unit 423, and an image processing unit 424.

The display control unit 421 displays a user interface screen (hereinafter, described as "UI screen") for receiving various operations by a user on a liquid crystal display unit having the touch panel function of the operation unit 220. The various operations include, for example, inputting of log-in authentication information for accessing the MFP cooperative server 120, selection of a proxy applicant in a case where a proxy applicant performs the receipt computerization work, scan setting, giving of scan start instructions, inputting of metadata, and the like.

The scan control unit 422 gives instructions to perform scan processing to the scan execution unit 411 along with scan setting information in accordance with the user operation (for example, pressing down of "Start scan" button) performed on the UI screen. The scan execution unit 411 causes the scanner unit 240 to perform the document reading operation via the scanner I/F 217 and generates scanned image data in accordance with the instructions to perform scan processing from the scan control unit 422. The generated scanned image data is saved in the HDD 214 by the scanned image management unit 412. At this time, the scan control unit 422 is notified of information on a scanned image identifier uniquely indicating the saved scanned image data.

The cooperative service request unit 423 makes requests for various kinds of processing to the MFP cooperative server 120, receives responses thereto, and so on. The various kinds of processing include, for example, log-in authentication, acquisition of a list of proxy applicants who can perform expense settlement as a proxy, analysis processing for scanned image data obtained by scanning a plurality of receipts, acquisition of metadata item information, setting of metadata, and the like. For transmission and reception with the MFP cooperative server 120, the communication protocol, for example, such as REST and SOAP, is used.

The image processing unit 424 generates an image used on the UI screen that is displayed by the display control unit 421 by performing predetermined image processing for scanned image data obtained by scanning a plurality of receipts. Details of the predetermined image processing will be described later.

<<Software Configuration of Server Apparatus>>

First, the software configuration of the MFP cooperative server 120 is explained. The MFP cooperative server 120 has a request control unit 431, an image processing unit 432, an expense settlement request unit 433, a data management unit 434, and a display control unit 435. The request control unit 431 stands by in the state of being capable of receiving a request from an external apparatus and instructs the image processing unit 432, the expense settlement request unit 433, and the data management unit 434 to perform predetermined processing in accordance with received request contents. The image processing unit 432 performs analysis processing, such as multi-cropping processing, OCR processing, and value information extraction processing, for scanned image data that is sent from the MFP 110. The expense settlement request unit 433 makes requests for various kinds of processing relating to the expense settlement service to the settlement server 130, receives the responses thereto, and so on. The various kinds of processing include, for example, acquisition of lists of proxy applicants and the types of expense, registration of an image corresponding to each individual receipt obtained based on the multi-cropping processing, setting of metadata corresponding to each image, and the like. In the present specification, the image cropped from a scanned image by the multi-cropping processing is called "cropped image". Further, the image corresponding to each of a plurality of scan-target documents is called "document image". Then, the document image in a case where the document is a receipt is particularly called "receipt image" sometimes. The data management unit 434 stores and manages user information, various kinds of setting data, and the like, which are managed in the server apparatus 120. The display control unit 435 receives a request from the web browser running on a PC or a mobile terminal (neither of them is shown schematically) connected via the internet and returns screen configuration information (HTML, CSS, and the like) that is necessary for the screen display. It is possible for a user to check the registered user information, change the scan setting, and so on, via the screen displayed on the web browser.

Next, the software configuration of the settlement server 130 is explained. The settlement server 130 has a request control unit 441, an expense information management unit 442, and a display control unit 443. The request control unit 441 stands by in the state of being capable of receiving a request from an external apparatus and in the present embodiment, returns information that is managed by the expense information management unit 442 to the MFP cooperative server 120 in response to the request from the MFP cooperative server 120. The display control unit 443 receives a request from a web browser running on a PC or a mobile terminal (neither of them is shown schematically) connected via the internet and returns screen configuration information (HTML, CSS, and the like) that is necessary for the screen display. It is possible for a user to check the expense information including information on a registered expense report and receipt images, and so on, via the screen that is displayed on the web browser.

<Flow of Processing of Entire Image Processing System>

Figure 5B:
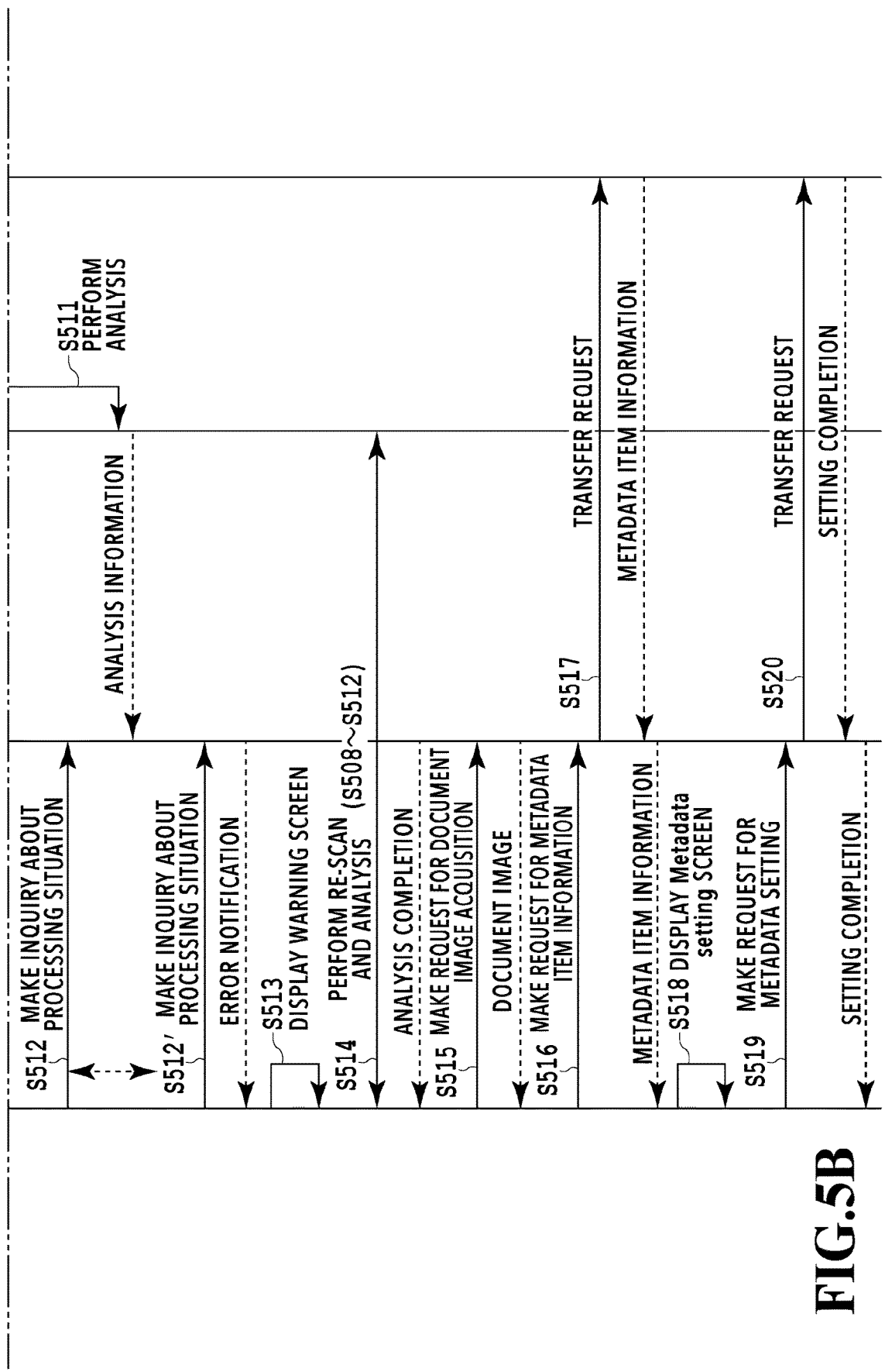
FIG. 5 is a diagram showing a relationship between FIGS. 5A and 5B, and FIGS. 5A and 5B are diagrams showing a flow of processing among apparatuses at the time of performing expense settlement by a cloud service.
Figure 6:
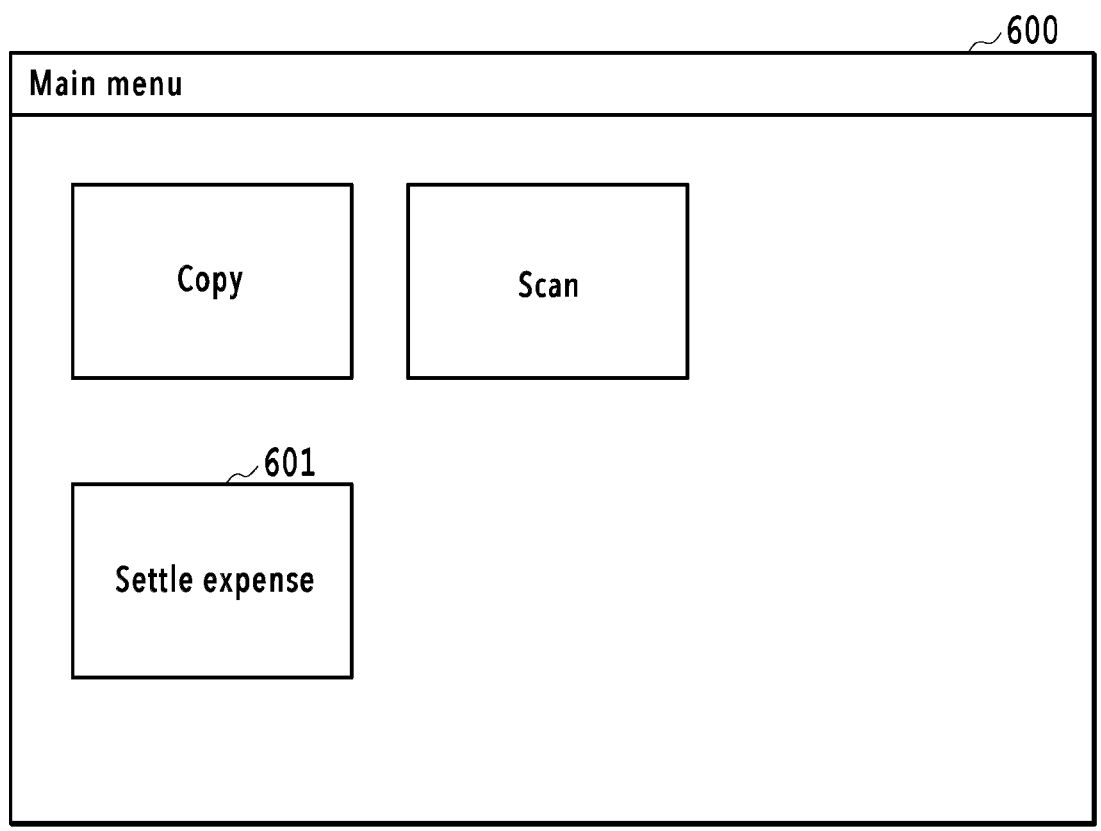
FIG. 6 is a diagram showing an example of a Main menu screen.

FIG. 5 is a sequence diagram showing a flow of processing among the apparatuses at the time of scanning a receipt in the MFP 110 and performing expense settlement by the cloud service. FIG. 6 is a diagram showing an example of a UI screen of a Main menu (hereinafter, described as "Main screen") that is displayed at the time of the activation of the MFP 110. By installing a dedicated application necessary to use the expense settlement service in the MFP 110, a "Settle expense" button 601 is displayed on a Main screen 600. Then, in a case where a user presses down the "Settle expense" button 601 among the menu buttons displayed within the Main screen 600, the series of processing shown in the sequence diagrams in FIGS. 5A and 5B starts. In the following, along the sequence diagrams in FIGS. 5A and 5B, the operations among the apparatuses are explained in a time series. In the following explanation, symbol "S" represents a step.

Figure 7:
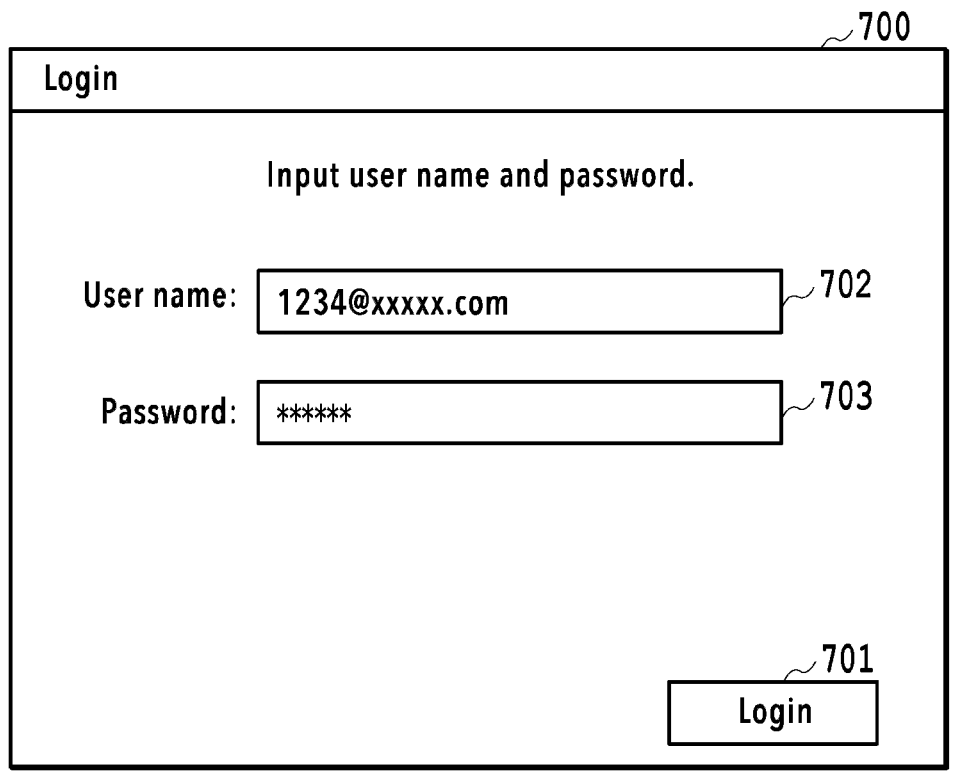
FIG. 7 is a diagram showing an example of a Login screen.

The MFP 110 displays a UI screen (hereinafter, described as "Login screen") on which to input information on log-in authentication for accessing the MFP cooperative server 120 on the operation unit 220 (S501). FIG. 7 shows an example of a Login screen. In a case where a user inputs a user ID and a password, which are registered in advance, in input fields 702 and 703, respectively, on a Login screen 700 and presses down a "Login" button 701, a request for log-in authentication is transmitted to the MFP cooperative server 120 (S502).

The MFP cooperative server 120 having received the request for log-in authentication performs authentication processing by using the user ID and the password, which are included in the request (S503). In a case where it is checked that the user is a genuine user by the results of the authentication processing, the MFP cooperative server 120 returns an access token to the MFP 110. After this, by sending this access token together at the time of the MFP 110 making various requests to the MFP cooperative server 120, a log-in user is specified. In the present embodiment, it is assumed that at the same time the login to the MFP cooperative server 120 is completed, the login to the settlement server 130 is also completed. Because of this, a user performs in advance association between the user ID for using the MFP cooperative service and the user ID for using the expense settlement service via a web browser or the like of the PC (not shown schematically) on the internet. Due to this, in a case where the log-in authentication to the MFP cooperative server 120 succeeds, the log-in authentication to the settlement server 130 is also completed at the same time and it is possible to omit the operation to log in to the settlement server 130. Then, it is made possible for the MFP cooperative server 120 to deal with a request relating to the expense settlement service from a user who has logged in to the MFP cooperative server 120. Generally, it is possible to perform the log-in authentication method by using a publicly known method (Basic authentication, Digest authentication, authentication using OAuth, and the like).

In a case where login is completed, the MFP 110 transmits an acquisition request for the proxy applicant list to the MFP cooperative server 120 along with the access token of the log-in user (S504). The proxy applicant list is name list information specifying a target person, who is a log-in user and can be a proxy applicant, in a case where a person other than the person who has received a receipt performs the receipt computerization work in the expense settlement service (proxy application). The proxy applicant list includes, for example, another user in a certain relationship with the log-in user, who is in the environment in which the same MFP 110 is used, such as a colleague in the department to which the log-in user belongs and the proxy applicant list is created in advance by, for example, a manager or the like. The MFP cooperative server 120 having received the acquisition request for the proxy applicant list transmits the acquisition request for the proxy applicant list of the log-in user specified by the access token to the settlement server 130 (S505). The settlement server 130 having received the acquisition request for the proxy applicant list reads the proxy applicant list for the log-in user and returns it to the MFP cooperative server 120. Then, the MFP cooperative server 120 transmits the proxy applicant list received from the settlement server 130 to the MFP 110. Due to this, the list information on "UserID" and "UserName" of a target person who is a log-in user and can be a proxy applicant as shown in FIG. 8 is acquired by the MFP 110. It may also be possible to transmit the proxy applicant list stored in the settlement server 130 to the MFP 110 as it is, or transmit it after changing the whole or a part of the format.

The MFP 110 having received the proxy applicant list displays a UI screen for setting an applicant (hereinafter, described as "Applicant setting screen") on the operation unit 220 (S506). FIG. 9 shows an example of an Applicant setting screen. In a selection field 902 on an Applicant setting screen 900, a list including the user names included in the proxy applicant list plus the user name of the log-in user him/herself is displayed in a pulldown menu as selection candidates. The log-in user selects the user name of him/herself in a case of performing the computerization work of a receipt received by the log-in user him/herself, or selects the user name of a proxy applicant in a case of performing the computerization work of a receipt received by a third person as a proxy applicant, and presses down a "Next" button 901.

Figure 10:
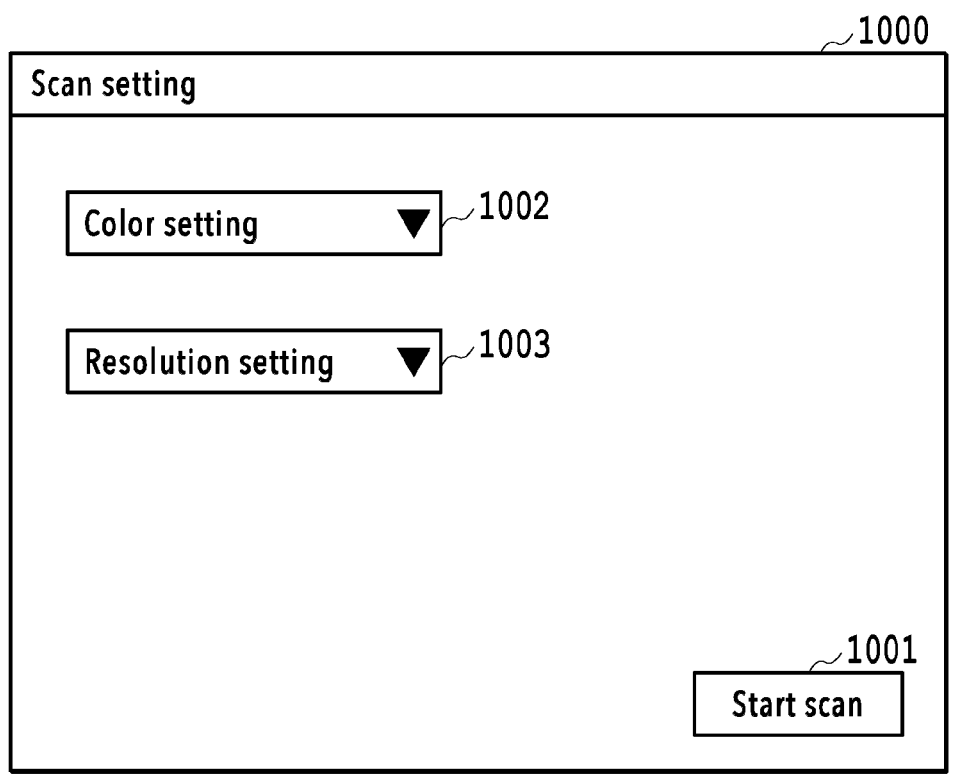
FIG. 10 is a diagram showing an example of a Scan setting screen.
Figure 11A:
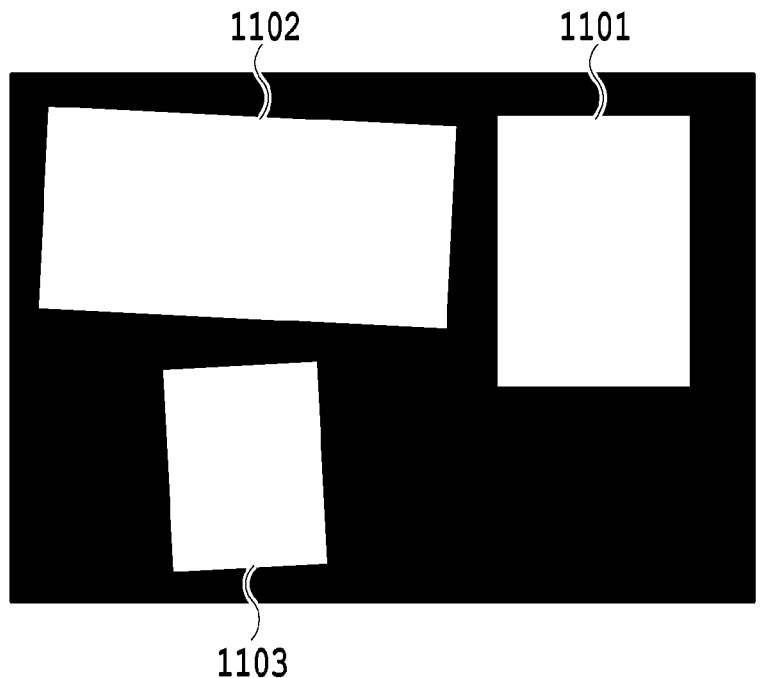
FIG. 11A and FIG. 11B are diagrams showing the way a plurality of receipts is scanned and FIG. 11A is a diagram showing a state where the receipts are placed with their surfaces facing downward and FIG. 11B is a diagram in a case where the receipts are viewed from inside a document table.
Figure 11B:
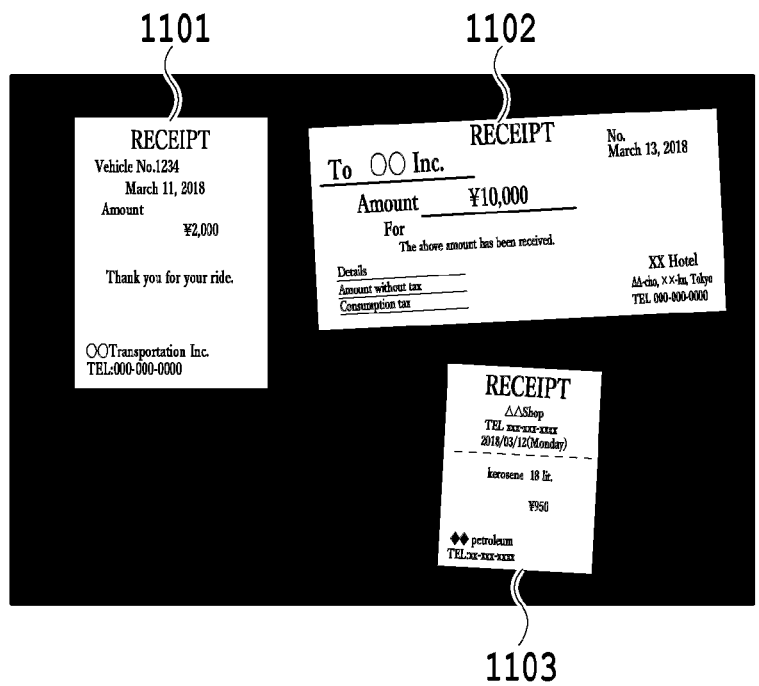

In a case where the "Next" button 901 is pressed down, a UI screen for setting operation conditions at the time of scan (hereinafter, described as "Scan setting screen") is displayed on the operation unit 220 (S507). FIG. 10 shows an example of a Scan setting screen. On a Scan setting screen 1000, a "Start scan" button 1001, a Color setting field 1002, and a Resolution setting field 1003 exist. The "Start scan" button 1001 is a button for giving instructions to start scan processing for a document (in the present embodiment, a plurality of receipts) placed on the document table. In the Color setting field, the color mode at the time of scan is set. For example, it is possible to specify one of alternatives, such as full color and monochrome. In the Resolution setting field 1003, the resolution at the time of scan is set. For example, it is possible to specify one of alternatives, such as 600 dpi and 1,200 dpi. The setting items of the color mode and the resolution are an example and it is not necessary for all of these setting items to exist, or another setting item other than these may exist. Further, it may also be possible to limit the alternatives relating to the color mode or the resolution only to the setting values required in the expense settlement service. A log-in user performs detailed condition setting as to the scan processing via the Scan setting screen 1000 such as this. In a case where a log-in user having completed the scan setting sets a scan-target receipt on the document table of the 110 and presses down the "Start scan" button 1001, a scan is performed (S508). FIG. 11A and FIG. 11B are each a diagram showing the way three receipts 1101, 1102, and 1103 are scanned en bloc and FIG. 11A shows a state where each receipt is placed on the document table with the read-target surface facedown and FIG. 11B shows a state where the receipts are viewed from inside the document table. In this manner, a plurality of receipts is scanned at the same time. After the scan is completed, the MFP 110 transmits the image data obtained by the scan to the MFP cooperative server 120 along with an analysis request therefor (S509).

In the MFP cooperative server 120 having received the analysis request for the scanned image, the request control unit 431 instructs the image processing unit 432 to perform analysis processing including the multi-cropping processing (S510). At that time, the request control unit 431 returns a request ID capable of uniquely specifying the received analysis request to the MFP 110. FIG. 12A shows an example of the request ID. On the other hand, the image processing unit 432 having received the instructions to perform analysis processing performs analysis processing for the scanned image (S511). In this analysis processing, first, the multi-cropping processing is performed. Then, for the image area corresponding to each individual document detected by the multi-cropping processing, rotation processing, character recognition (OCR) processing, value information extraction processing, and document type detection processing are performed. Specifically, first, in a case where each image area corresponding to each individual document is inclined, correction is performed so that the state is brought about where each side of the document is horizontal or vertical. Then, character information is specified by performing OCR processing for each corrected image area. Then, from each image area, information on a specific character string (value information), such as date and amount, is extracted. For example, in a case where the total amount is extracted, by using the character string "Total" as a key, the corresponding character string located therearound (for example, "¥100") is extracted as a value. Further, by detecting the document type, the kind of document corresponding to each image area is specified. The analysis results thus obtained are delivered to the request control unit 431.

Figure 13A:
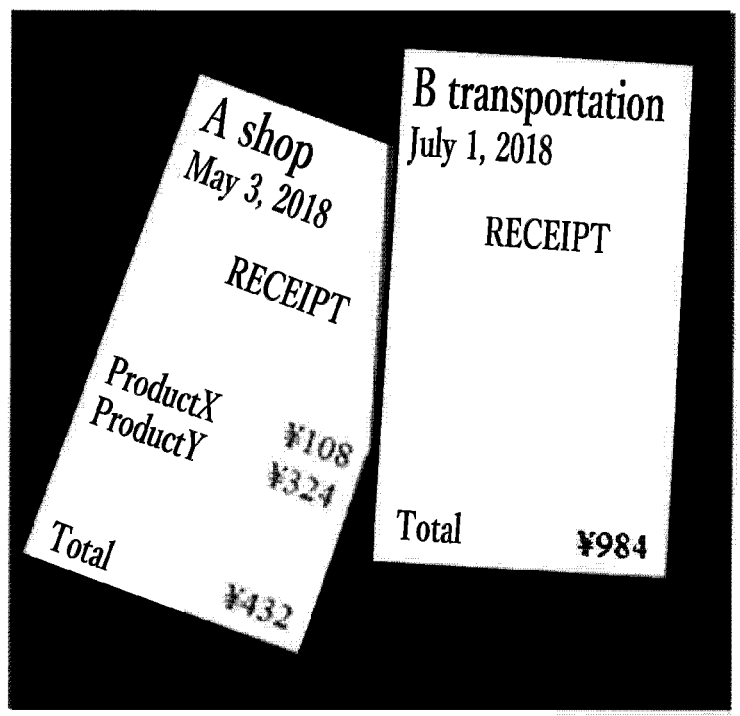
FIG. 13A is an explanatory diagram of a case where extraction of value information succeeds even though there is an overlap between documents and FIG. 13B is an explanatory diagram of a case where extraction of value information fails.
Figure 13B:
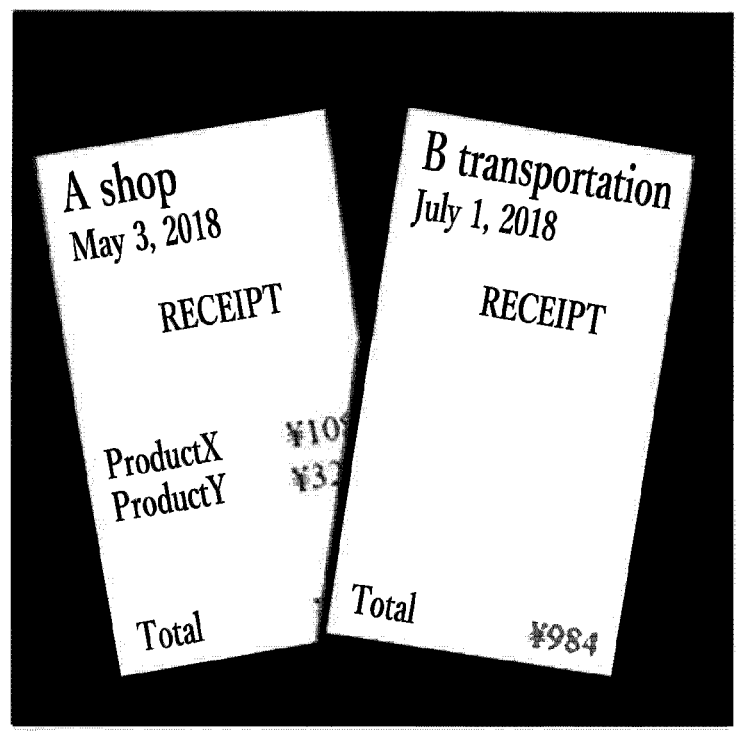

While the above-described analysis processing is being performed, the MFP 110 periodically (for example, every three seconds or the like) makes an inquiry about the processing situation to the MFP cooperative server 120 by using the above-described request ID (S512 to S512'). This inquiry is made repeatedly until the completion response of the analysis processing from the MFP cooperative server 120 is acquired. Upon receipt of the inquiry about the processing situation, the MFP cooperative server 120 checks the progress situation of the analysis processing corresponding to the request ID and in a case where the analysis processing is not completed, the MFP cooperative server 120 returns a response (see FIG. 12B) indicating that the processing is in progress. Then, in a case where there is a possibility that the extraction of the value information has failed due to an overlap between documents, the MFP cooperative server 120 returns a response indicating the occurrence of an error (see FIG. 12C). Here, a specific example of a case is explained where extraction of a character string of value information fails due to an overlap between documents. Here, it is assumed that as value information, a character string corresponding to the total amount is extracted. FIG. 13A shows a case where extraction of value information succeeds even though there is an overlap between documents and FIG. 13B shows a case where extraction fails resulting from the occurrence of an overlap between documents. In the case in FIG. 13A, the receipt of "B transportation" overlaps the receipt of "A shop", but the character string "Total" corresponding to the key and the character string "¥432" corresponding to the value are not hidden. Consequently, it is possible to extract the value information from not only the receipt of "B transportation" but also the receipt of "A shop" without any problem. On the other hand, in the case in FIG. 13B, the character string "¥432" corresponding to the value in the receipt of "A shop" is hidden by the receipt of "B transportation", and therefore, it is not possible to extract the value information. In a case where it is determined that the character string of the key or the value is hidden (the possibility of that is strong) due to an overlap between documents as in FIG. 13B, the MFP cooperative server 120 returns an error response shown in FIG. 12C described above to the MFP 110. At this time, the data on the receipt image for which the possibility is determined that the extraction of the value information has failed due to an overlap between documents is also transmitted to the MFP 110. Details of the analysis processing in the MFP cooperative server 120 will be described later.

Figure 14:
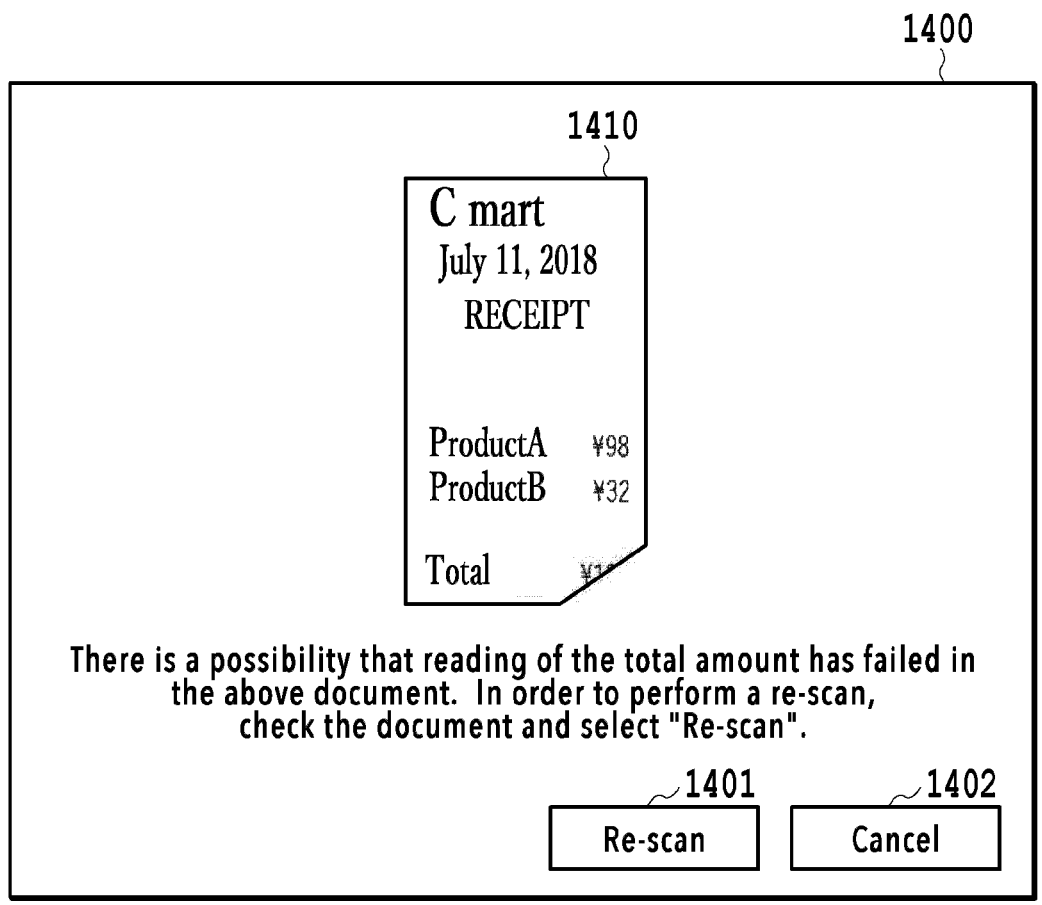
FIG. 14 is a diagram showing an example of a warning screen.

In a case of receiving the above-described error response, the MFP 110 issues a warning about the possibility that the extraction of the value information has failed to a user and displays a UI screen (hereinafter, called "warning screen") to prompt re-scanning of documents on the operation unit 220 (S513). FIG. 14 shows an example of the warning screen. In an image display area 1410 on a warning screen 1400, the target receipt image is subjected to reduction processing and preview-displayed and under the image display area 1410, a message about the possibility that the extraction of the value information has failed and a message to check whether or not the re-scan is necessary are displayed. A "Re-scan" button 1401 is a button for performing a scan again. In a case where a user places documents on the document table again and so on and presses down the "Re-scan" button 1401, the scan processing is performed again and the analysis processing is performed for the scanned image obtained by this (hereinafter, called "re-scanned image") (S514). Here, S514 is represented as one piece of processing, but the contents thereof are configured by each piece of processing at S508 to S512 described previously. That is, after the scan processing is performed again, an analysis request for the re-scanned image is transmitted and in the MFP cooperative server 120, the analysis processing therefore is performed. In a case where the re-scan is not necessary, a user presses down a "Cancel" button 1402. In this case, the scan processing is not performed again and a request to give instructions to continue the analysis processing is sent to the MFP cooperative server 120. Upon receipt of the request to continue the analysis processing, in the MFP cooperative server 120, the rest of the analysis processing is resumed.

In a case of completing the analysis processing, the MFP cooperative server 120 returns a response indicating completion (see FIG. 15). As shown in FIG. 15, the response at the time of processing completion includes information on the analysis results of the scanned image, in addition to the status information. FIG. 15 corresponds to FIG. 11 described previously and shows information on the analysis results of the scanned image obtained by scanning three receipts. First, in "Status", the character string (completed) whose contents represent completion is input. In "Images", each piece of information on "ImageID", "ContentsType", and "ReceiptData" is stored for each cropped image corresponding to the document detected by the multi-cropping processing. "ImageID" is ID information identifying each document image, which is represented by a character string using, for example, URL or a URL parameter. By specifying this ImageID and transmitting an acquisition request to the MFP cooperative server 120, it is possible to acquire the specific document image. "ContentsType" indicates the detected kind of document. For example, in a case of "receipt", the character string is "Receipt", in a case of "business card", the character string is "BusinessCard", in a case of "driver's license", the character string is "DriverLicense" and so on. "ReceiptData" is information that is included additionally in a case where "ContentsType" is "Receipt" indicating a receipt, and the value of "Date" representing the date and the value of "Amount" representing the total amount, which are obtained by the value information extraction processing, are stored. "Points" is coordinate information indicating in which area of the scanned image the document is located. The coordinate information indicates each position of the top-left corner, the top-right corner, the bottom-right corner, and the bottom-left corner of each document image in order from the top-left corner with the top-left corner of the scanned image being taken as the origin (x, y)=(0, 0).

After receiving the completion response of the analysis processing, the MFP 110 specifies ImageID of the document image of the receipt, which is displayed first, and transmits an image acquisition request to the MFP cooperative server 120 (S515). Upon receipt of the image acquisition request, the MFP cooperative server 120 returns the data on the document image corresponding to ImageID to the MFP 110. The orientation of this document image is correct due to the rotation processing Next, the MFP 110 transmits an acquisition request for metadata item information to the MFP cooperative server 120 (S516). The metadata item information is list information describing contents (for example, the purpose of use of a receipt) of the metadata item that is registered in association with each document image. FIG. 16 shows an example of the metadata item information. In "ExpenseTypes", as a defined value representing the purpose of use of the receipt, a character string of "ID" and a character string of "Name" are included. Upon receipt of the acquisition request for the metadata item information from the MFP 110, the MFP cooperative server 120 transmits an acquisition request corresponding thereto to the settlement server 130 and acquires the metadata item information on the log-in user (S517). It may also be possible for the MFP cooperative server 120 to return the metadata item information acquired from the settlement server 130 to the MFP 110 as it is, or return what is modified appropriately. For example, in a case where a plurality of pieces of the metadata item information is necessary in order to satisfy the acquisition request from the MFP 110, first, the MFP cooperative server 120 acquires them by transmitting an acquisition request for the plurality of pieces of the metadata item information to the settlement server 130. Then, in a case where the MFP cooperative server 120 returns a response to the MFP 110, it may also be possible to return information obtained by integrating each piece of the metadata item information into one piece. On the contrary, it may also be possible to return information obtained by selecting necessary information from the metadata item information returned by the settlement server 130.

The MFP 110 having received the metadata item information displays a UI screen (hereinafter, described as "Metadata setting screen") for setting metadata to each document image on the operation unit 220 based on the analysis results of the scanned image (S518). This Metadata setting screen is generated in units of document images (here, in units of receipt images) cropped from the scanned image and displayed on the operation unit 220. FIG. 17 shows an example of the Metadata setting screen. In an image display area 1710 on a Metadata setting screen 1700, the metadata setting-target receipt image is subjected to reduction processing and preview-displayed. Further, on the Metadata setting screen 1700, a variety of buttons exist as input elements for a user to give various instructions. A "Next" button 1702 or a "Back" button 1703 is a button for switching displays of the Metadata setting screen generated for each receipt image. The "Next" button 1702 is a button for displaying the Metadata setting screen for the next receipt image. In a case where the Metadata setting screen of the last receipt image among the receipt images cropped from the scanned image is displayed, the "Next" button 1702 is in the non-display state. The "Back" button 1703 is a button for displaying the Metadata setting screen of the one previous receipt image. In a case where the Metadata setting screen of the first receipt image among the receipt images cropped from the scanned image is displayed, the "Back" button 1703 is in the non-display state. Then, in each of input fields 1704 to 1707 of four items (ExpenseTypeID, TransactionDate, Amount, Location) provided on the right side of the image display area 1710, each corresponding value in the displayed receipt image is input. In the "Expense Type" input field 1704, the candidates of the expense type are displayed and a user selects one from among the candidates displaying the expense type corresponding to the processing-target receipt. In the example in FIG. 16 described previously, a list of the character strings, such as "Hotel" and "Car Rental", is displayed as candidates. In the "Transaction Date" input field 1705, the date of transaction of the processing-target receipt is input. In the "Amount" input field 1706, the amount of the processing-target receipt is input. Then, at the point in time of the initial display of the Metadata setting screen 1700, the information, such as "Date" and "Amount" within "ReceiptData" (see FIG. 15), about the receipt image relating to the preview display is displayed as each initial value. As described above, as regards the items described in "ReceiptData" of the completion response, the value information obtained by the analysis processing is displayed as the initial value at the point in time of the initial display of the Metadata setting screen, and therefore, it is possible for a user to save the time and effort necessary to input the corresponding value. In the "Location" input field 1707, the location at which the receipt is issued is input. In this case, for example, it may also be possible to display a list of location items as candidates so that the information on the location item is acquired additionally at the time of acquisition of the metadata item information described previously. As a method of manually inputting a value in the input fields 1705 to 1707, for example, it is sufficient to display a keyboard on the screen in response to the pressing down of the target input field to enable a user to input an arbitrary figure or character string.

In a case where the log-in user who has completed inputting of the necessary information for each receipt image presses down a "Transmit" button 1701 within the Metadata setting screen 1700, the MFP 110 transmits a metadata setting request to the MFP cooperative server 120 (S519). At this time, the data relating to the above-described four items (ExpenseTypeID, TransactionDate, Amount, Location) input on the Metadata setting screen 1700 is transmitted in the format as shown in FIG. 18 along with the metadata setting request. It may also be possible to bring the "Transmit" button 1701 within the Metadata setting screen 1700 into the invalid state until the Metadata setting screen 1700 for all the receipt images cropped from the scanned image is displayed. Further, in the present embodiment, one Metadata setting screen is displayed for one receipt image, and therefore, it is necessary to transmit the metadata setting requests corresponding to the number of receipts detected within the scanned image. However, it may also be possible to enable the transmission of the metadata setting requests for a plurality of receipt images en bloc.

The MFP cooperative server 120 having received the metadata setting request from the MFP 110 transmits a registration request for the receipt image relating to the request and a setting request for the metadata to the settlement server 130 (S520). The settlement server 130 having received the requests for image registration and metadata setting from the MFP cooperative server 120 performs processing to register and set the receipt image and the metadata relating to the requests to the expense information managed by the settlement server 130 itself. After that, the settlement server 130 returns a response indicating that the registration of the receipt image and the setting of the metadata are completed to the MFP cooperative server 120. Then, the MFP cooperative server 120 having received the above-described completion response from the settlement server 130 also returns the same completion response to the MFP 110.

The above is the flow of the processing of the entire image processing system.

<Details of Processing in MFP>

Figure 19:
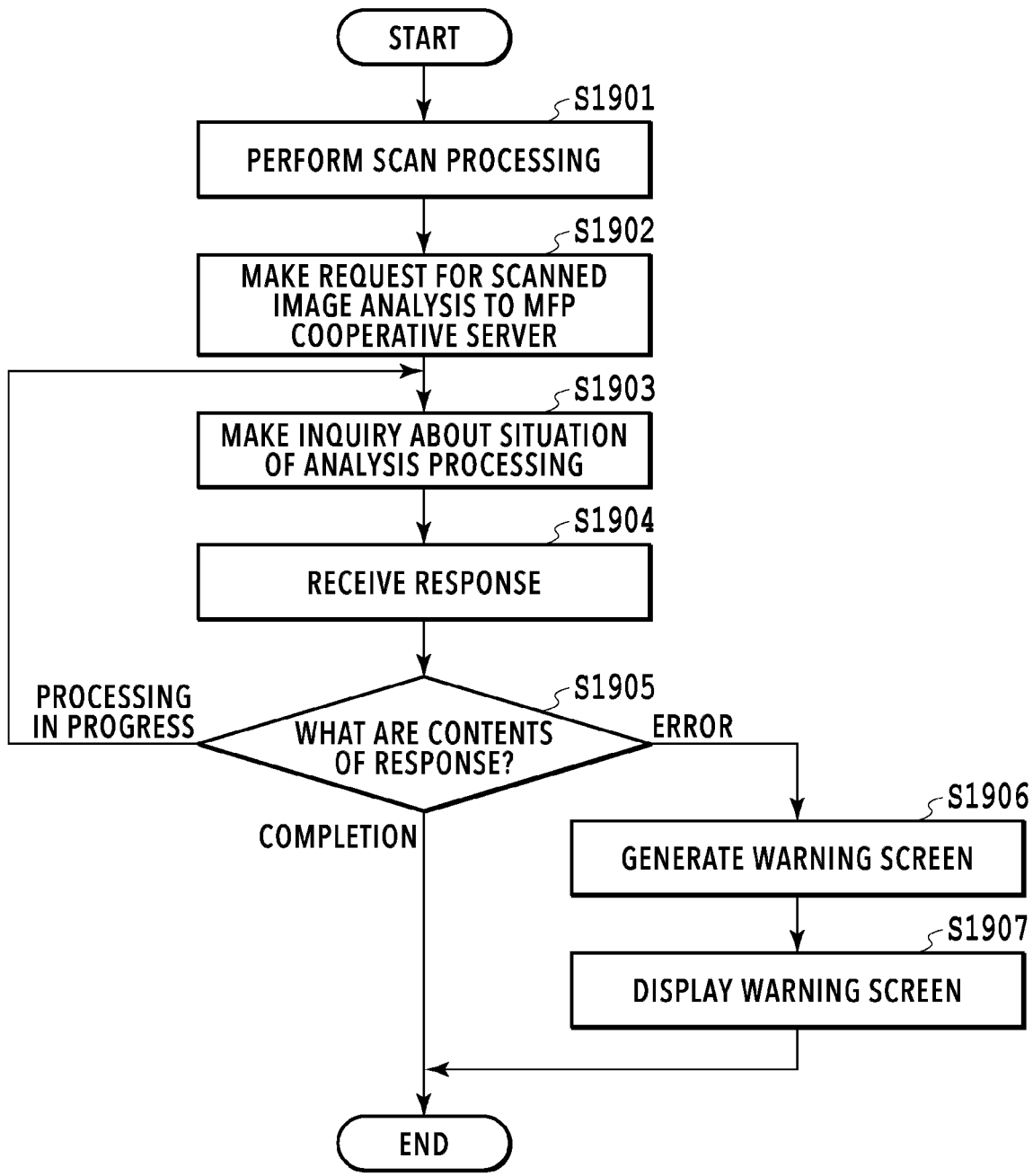
FIG. 19 is a flowchart showing a flow of processing in the MFP.

Following the above, the processing at S508 to S513 in the sequence diagram in FIG. 5 is explained by focusing attention on the operation in the MFP 110. FIG. 19 is a flowchart showing a flow of the processing in the MFP 110 during the processing at S508 to S513. The series of processing is implemented by the CPU 211 executing the control program stored in the HDD 214 and started in response to the pressing down of the "Start scan" button 1001 on the Scan setting screen 1000 described previously in the control unit 210. In the following, detailed explanation is given along the flowchart shown in FIG. 19. Symbol "S" at the top of each piece of processing means a step. At S1901 the scan control unit 422 having received the notification of the pressing down of the "Start scan" button 1001 from the display control unit 421 instructs the scan execution unit 411 to perform scan processing. Upon receipt of the instructions, the scan execution unit 411 scans a receipt placed on the document table. The scanned image data generated by the scan is saved in the scanned image management unit 412 and the display control unit 421 is notified of an identifier capable of specifying the scanned image. At this time, it may also be possible to display a message screen (not shown schematically) indicating that the scan is in progress on the display unit 220.

At S1902, the cooperative service request unit 423 acquires the scanned image data via the display control unit 421 and transmits it to the MFP cooperative server 120 along with the analysis request therefor. Based on the analysis request, in the MFP cooperative server 120, the analysis processing described previously is performed for the received scanned image data. At that time, a request ID is returned from the request control unit 431 of the MFP cooperative server 120.

The cooperative service request unit 423 having acquired the request ID transmits an acquisition request for the processing status to the MFP cooperative server 120 along with the request ID at S1903. Based on the acquisition request, the MFP cooperative server 120 returns a response in accordance with the progress situation of the analysis processing specified by the request ID to the MFP 110.

At S1904, the cooperative service request unit 423 receives the response that is sent from the MFP cooperative server 120. Then, at S1905, the processing that is performed next is determined in accordance with the received response. In a case where the received response is the contents (see FIG. 12B) indicating that the processing is in progress, the processing returns to S1903 and after waiting for a predetermined time (for example, about several seconds) to elapse, the cooperative service request unit 423 transmits the acquisition request for the processing status to the MFP cooperative server 120 again. In a case where the received response is the contents indicating an error (see FIG. 12C), the processing advances to S1906. Then, in a case where the received response is the contents (see FIG. 15) indicating completion, this flow is exited. At this time, it may also be possible to display a message indicating that the analysis processing is completed normally on the operation unit 203.

At S1906, the image processing unit 432 generates the warning screen 1400 described previously by using the data on the receipt image (receipt image for which the possibility is determined that the extraction of the value information has failed) sent from the MFP cooperative server 120 along with the error response. Then, at S1907, the display control unit 421 displays the warning screen generated at S1906 on the operation unit 220.

The above is the flow of the processing from execution of a scan until the warning screen is displayed, which focuses attention on the operation of the MFP 110.

<Details of Processing in Server>

Figure 20:
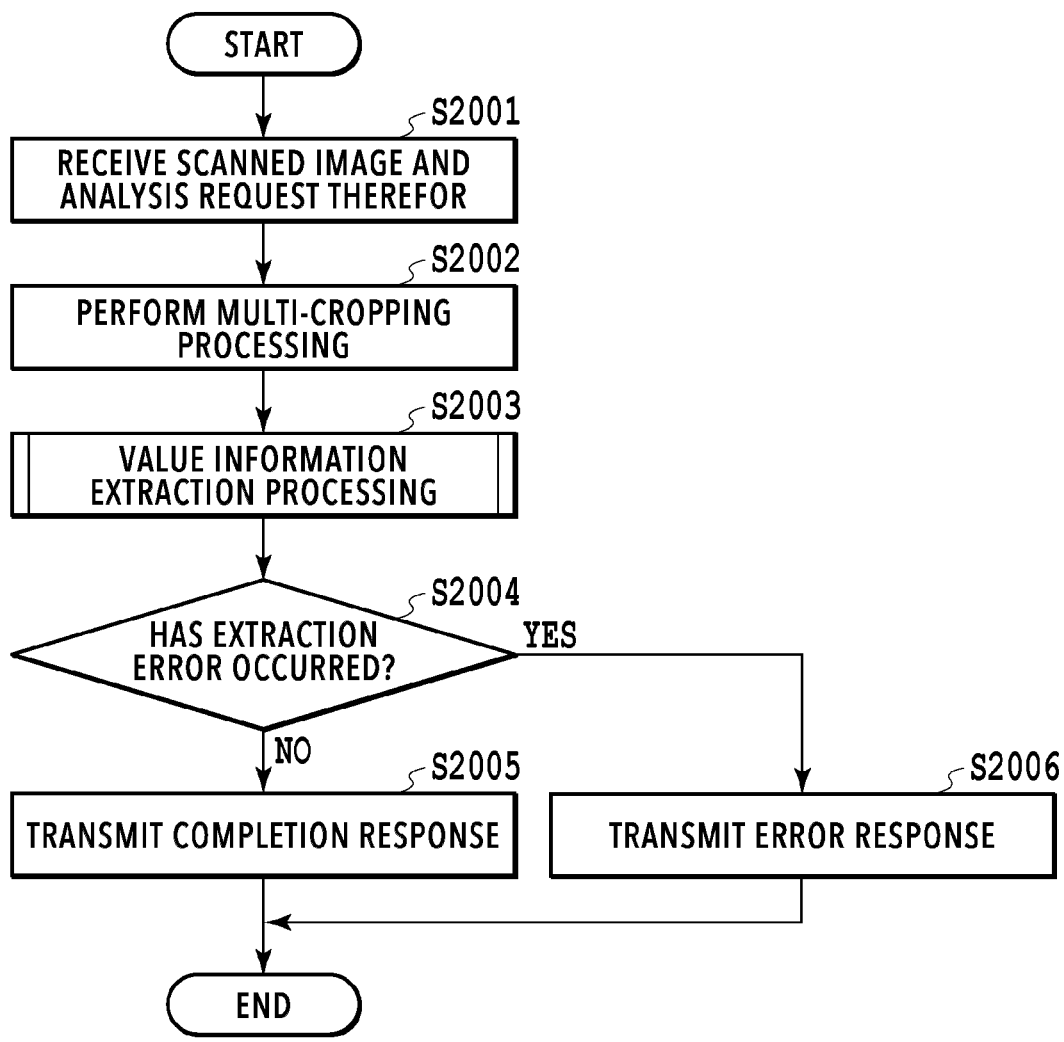
FIG. 20 is a flowchart showing a flow of processing in the MFP cooperative server.

Following the above, the processing at S510 to S512 in the sequence diagram in FIG. 5 is explained by focusing attention on the operation in the MFP cooperative server 120. FIG. 20 is a flowchart showing a flow of processing in the MFP cooperative server 120 during the processing at S510 to S512. This series of processing is implemented by the CPU 311 executing the control program stored in the HDD 314 and started in a case where transmission of the scanned image analysis request (S509) described previously is detected in the control unit 310. In the following, detailed explanation is given along the flowchart shown in FIG. 20. Symbol "S" at the top of each piece of processing means a step.

At S2001, the request control unit 431 receives the scanned image data and the analysis request therefor, which are sent from the MFP 110. Then, the request control unit 431 instructs the image processing unit 432 to analyze the scanned image.

At S2002, the image processing unit 432 performs the multi-cropping processing for the scanned image. Specifically, the image processing unit 432 performs processing to detect the image area of each document (here, each receipt) from the scanned image by frame edge extraction or the like and crop an image in units of documents. At S2003 that follows, the image processing unit 432 performs the value information extraction processing described previously for the image cropped at S2002 (cropped image). In a case where the cropped image corresponds to a plurality of documents in place of one document, in the value information extraction processing, processing to divide the cropped image into images in units of documents is also performed. The results of the value information extraction processing are delivered to the request control unit 431.

At S2004, the request control unit 431 determines whether the value information has been extracted normally from the images in units of documents obtained from the scanned image (whether an extraction error has occurred). In a case where the value information has been extracted normally from all the document images, the processing advances to S2005 and the request control unit 431 transmits the completion response of the analysis processing described previously to the MFP 110. On the other hand, in a case where the value information extraction error has occurred, the processing advances to S2006 and the request control unit 431 transmits the error response described previously to the MFP 110 along with the data on the document image relating to the extraction error.

The above is the flow of the processing from reception of the analysis request for the scanned image until transmission of the response of the analysis processing results, which focuses attention on the operation of the MFP cooperative server 120.

<Details of Value Information Extraction Processing>

Figure 21:
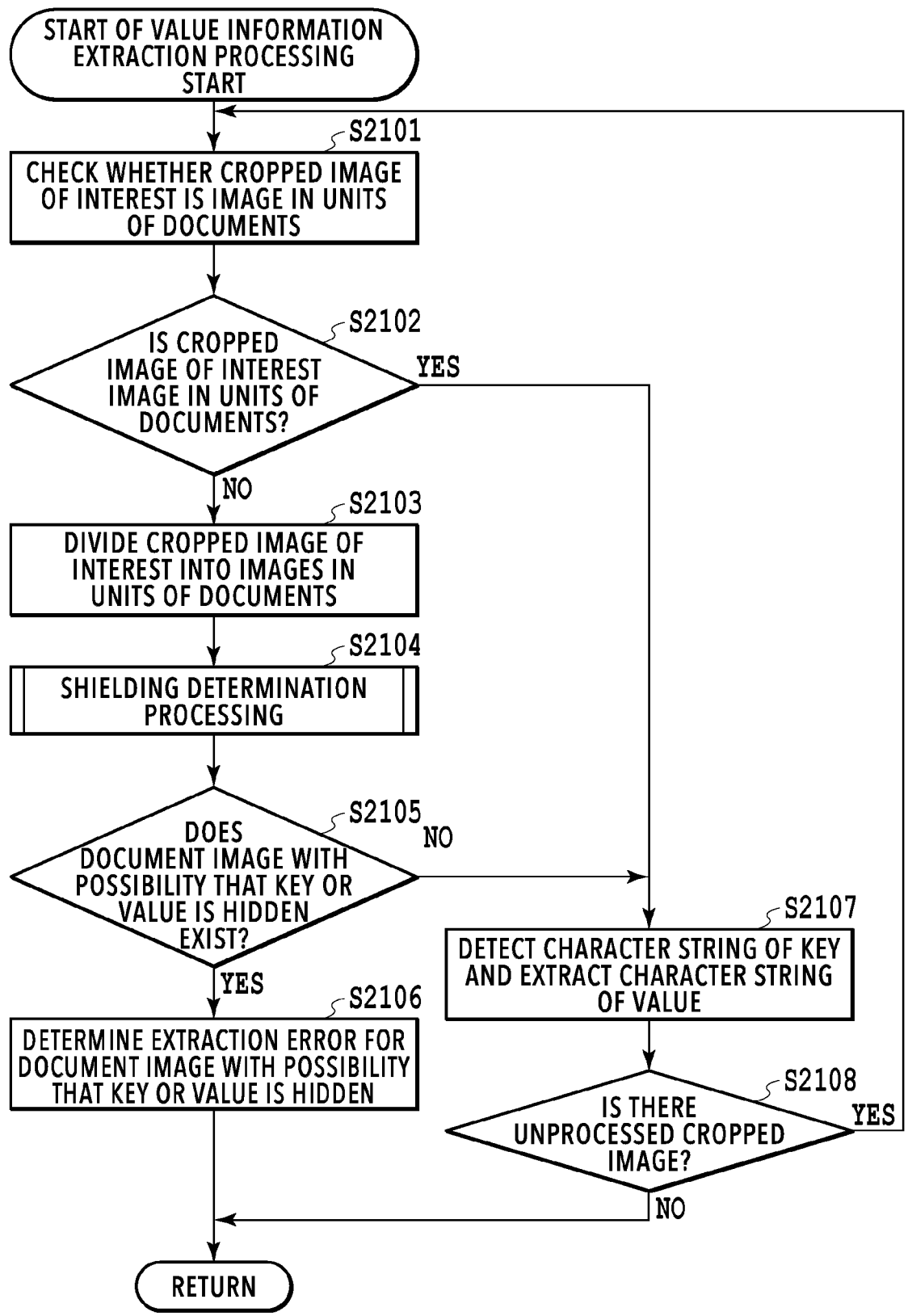
FIG. 21 is a flowchart showing a flow of value information extraction processing.

Following the above, the value information extraction processing at S2003 in the flow in FIG. 20 described above is explained in detail. FIG. 21 is a flowchart showing details of the value information extraction processing.

Figure 22A:
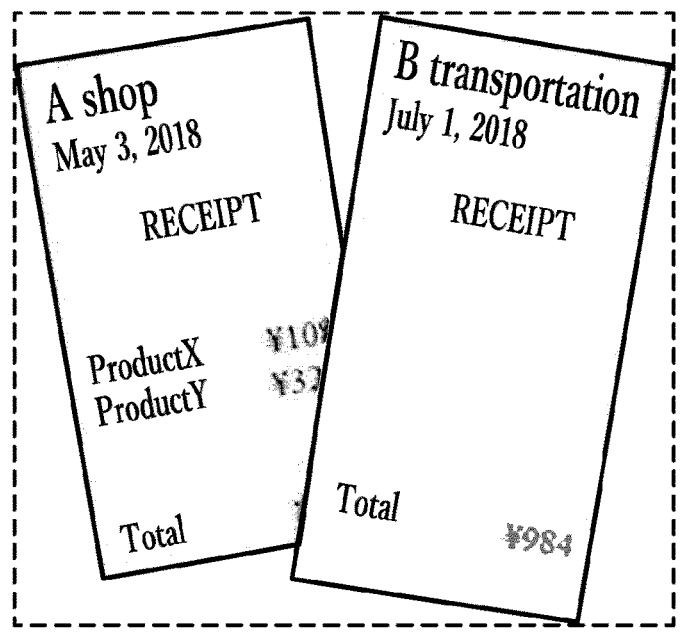
FIG. 22A is a diagram showing an example in a case where image areas of a plurality of documents are included in a cropped image and FIG. 22B is a diagram showing an example in a case where image division is performed.

At S2101, among the cropped images cropped at 2002, a cropped image of interest is determined and whether the copped image of interest is an image in units of documents is checked. FIG. 22A is an example of a case where images of a plurality of documents are included in the cropped image. In a case of the state where two receipts overlap, it is not possible to detect the frame edge of each receipt, and therefore, the cropped image such as this is cropped from the scanned image. Consequently, whether or not a plurality of documents overlaps within the cropped image is determined based on the number of vertexes included in the cropped image, the shape of the frame edge and the like. For example, in a case where the cropped image includes only the image of one receipt, the edges of the one receipt are detected, and therefore, the number of vertexes is four and the shape of the frame edge is a rectangle. In contrast to this, in the example in FIG. 22A, the edges are detected in the state where two receipts overlap, and therefore, the number of vertexes is nine and the shape of the frame edge is a distorted shape, different from a rectangle. By focusing attention on the difference such as this, the presence/absence of an overlap between documents is determined. The method of determining an overlap between documents is not limited to this and for example, it may also be possible to determine based on the number of segments whose length is a predetermined length or longer.

At S2102, based on the determination results at S2101, the next processing is determined. In a case where the determination results indicate that there is no overlap between documents and the cropped image of interest is an image in units of documents, the processing advances to S2107. On the other hand, in a case where an overlap between documents exists and the cropped image of interest is not an image in units of documents, the processing advances to S2103.

Figure 22B:
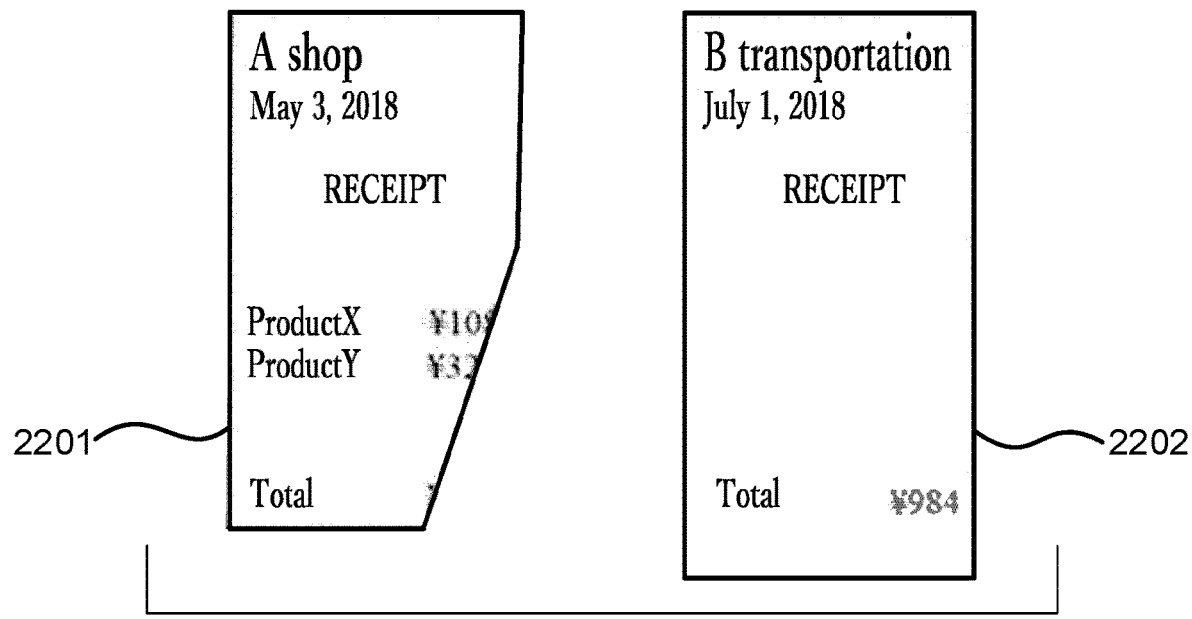

At S2103, the processing to divide the cropped image of interest into images in units of documents is performed. As the method of image division, it may be possible to apply a publicly known method, such as a method in which a character string is extracted by performing OCR processing, whether the document is upside down is determined based on the continuity of the character string, and further, the image is divided into images in units of documents based on the information on the frame edge. In a case of the cropped image shown in FIG. 22A described above, the cropped image is divided into two document images 2201 and 2202 as shown in FIG. 22B.

Figure 23A:
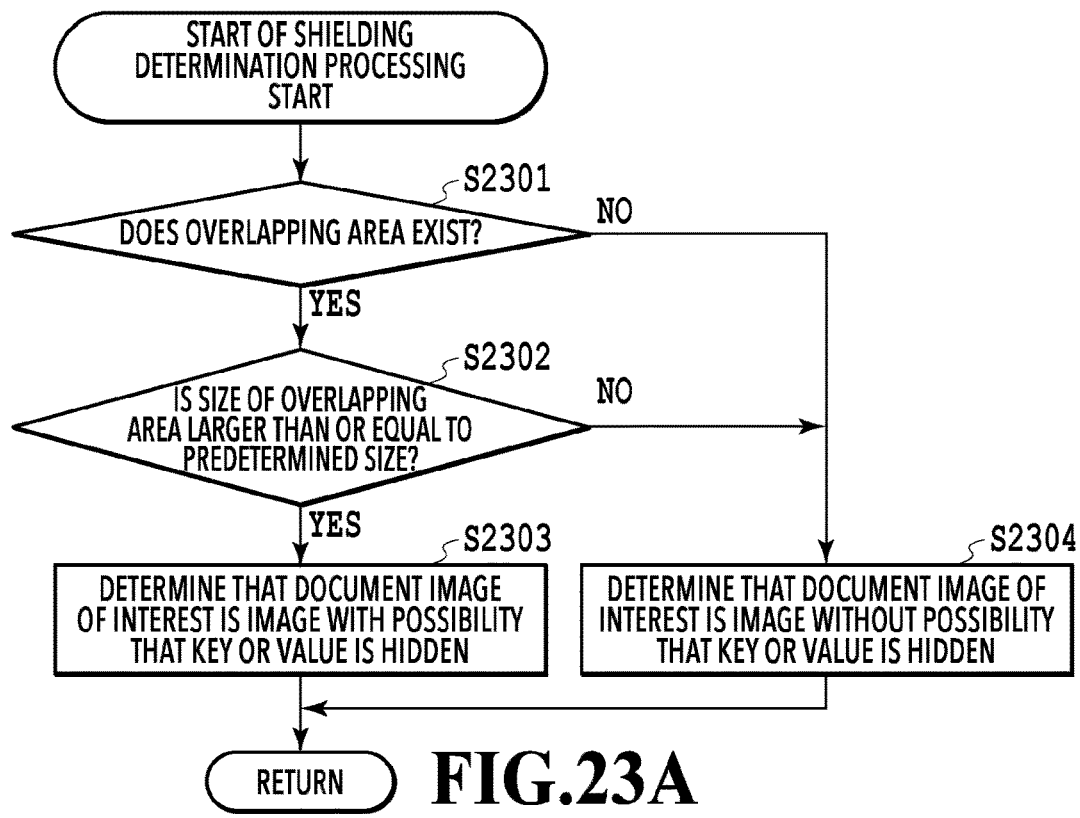
FIG. 23A is a flowchart showing details of shielding determination processing according to a first embodiment and FIG. 23B is a flowchart showing details of shielding determination processing according to a second embodiment.

At S2104, for each document image obtained by the image division processing, processing (shielding determination processing) to determine whether the character string corresponding to the key or the value necessary for extraction of value information is shielded by another document is performed. FIG. 23A is a flowchart showing details of the shielding determination processing according to the present embodiment. Here, the details thereof are explained along the flow in FIG. 23A.

At S2301, for the document image of interest among the plurality of document images obtained by the division, whether a document overlapping area (area that is not read at the time of scan because the area is overlapped by another document) exists is determined. In a case where an overlapping area exists, the processing advances to S2302 and in a case where no overlapping area exists, the processing advances to S2304. In the example in FIG. 22B described previously, of the two documents images obtained by the division, in the document image 2201, a document overlapping area exists, but in the document image 2202, no document overlapping area exits. At this step, among the plurality of document images obtained by the division, the image that lacks a part thereof because of an overlap between documents is specified. Next, at S2302, whether or not the size of the overlapping area specified at S2301 is larger than or equal to a predetermined threshold value is determined. At this time, it may also be possible to define the threshold value, which is a reference, by using the absolute value of the number of pixels or define by a relative value in a case where the size of the overlapping area is compared with the actual size of the scanned document. In a case of the former, the threshold value is such that the number of pixels configuring the overlapping area is 10,000 or more, and in a case of the latter, the threshold value is such that the size of the overlapping area is 5% or more of the original document size. In a case where the size of the overlapping area is larger than or equal to the threshold value, the processing advances to S2303 and in a case where the size is less than the threshold value, the processing advances to S2304. Then, at S2303, it is determined that the document image of interest is an image with a possibility that the key or the value is hidden due to an overlap between documents. At this time, the data on the document image of interest is stored in the RAM 213 as the image data to be transmitted to the MFP 110 along with an error response. Further, at S2304, it is determined that the document image of interest is an image without a possibility that the key or the value is hidden.

In a case where the above processing is completed for all the document images obtained by the image division, the processing returns to the flowchart in FIG. 21.

At S2105, the next processing for each document image obtained by the image division at S2103 is determined based on the shielding determination processing at S2104. Specifically, for the document image for which the possibility is determined that the key or the value is hidden, the processing advances to S2106. On the other hand, for the document image for which the possibility is not determined that the key or the value is hidden, the processing advances to S2107.

At 2106, for the document image with a possibility that the key or the value is hidden, an extraction error is determined. Due to this, the error response described previously is returned to the MFP 110.

At S2107, from the processing-target document image, the character string of the value corresponding to the specific key is extracted. Here, the processing-target document image is the cropped image of interest determined to be an image in units of documents at S2102, or the document image determined to be one without a possibility that the key or the value is hidden among the document images obtained by the image division at S2103. At this step, first, OCR processing is performed for the processing-target document image. Next, from the OCR results, the character string (for example, "Total") specified in advance as the key is detected and the character string (for example, "¥984") as the value corresponding to the key is extracted from around the detected character string. It may also be possible to limit the "around" the detected character string in this case to a specific peripheral area (for example, the character area existing on the right side of the character string detected as the key with the character string as a reference) and it is sufficient for a user to set the area in advance. Further, it may also be possible to make the contents of the "around" the detected character string differ for each specific key specified in advance.

At S2108, whether the processing is completed for all the cropped images cropped from the scanned image is determined. In a case where there is an unprocessed cropped image, the processing returns to S2101, and the next cropped image of interest is determined and the processing is continued. On the other hand, in a case where the processing is completed for all the cropped images, this processing is exited.

The above is the contents of the value information extraction processing. In the shielding determination processing (S2104) described above, the possibility that the key or the value is hidden is determined based on the size of the overlapping area, but it may also be possible to uniformly determine the possibility that the key or the value is hidden in a case where, for example, an overlapping area exists.

As above, according to the present embodiment, in a case where there is a possibility that the character string necessary for extraction of the value information is hidden due to an overlap between documents at the time of scan, a user is prompted to re-scan the document. Due to this, it is possible to prevent such a case where a user notices the insufficiency of the registered document images after attaching the metadata to the document images and registering them in the storage server or the like and the user needs to scan the documents again.

Second Embodiment

In the first embodiment, based on the size of the document overlapping area, whether or not there is a possibility that the key or the value is hidden is determined. Next, an aspect is explained as a second embodiment in which the determination accuracy of the shielding determination processing is improved by performing determination based on a positional relationship between the character string of the key or the value and the overlapping area.

Figure 23B:
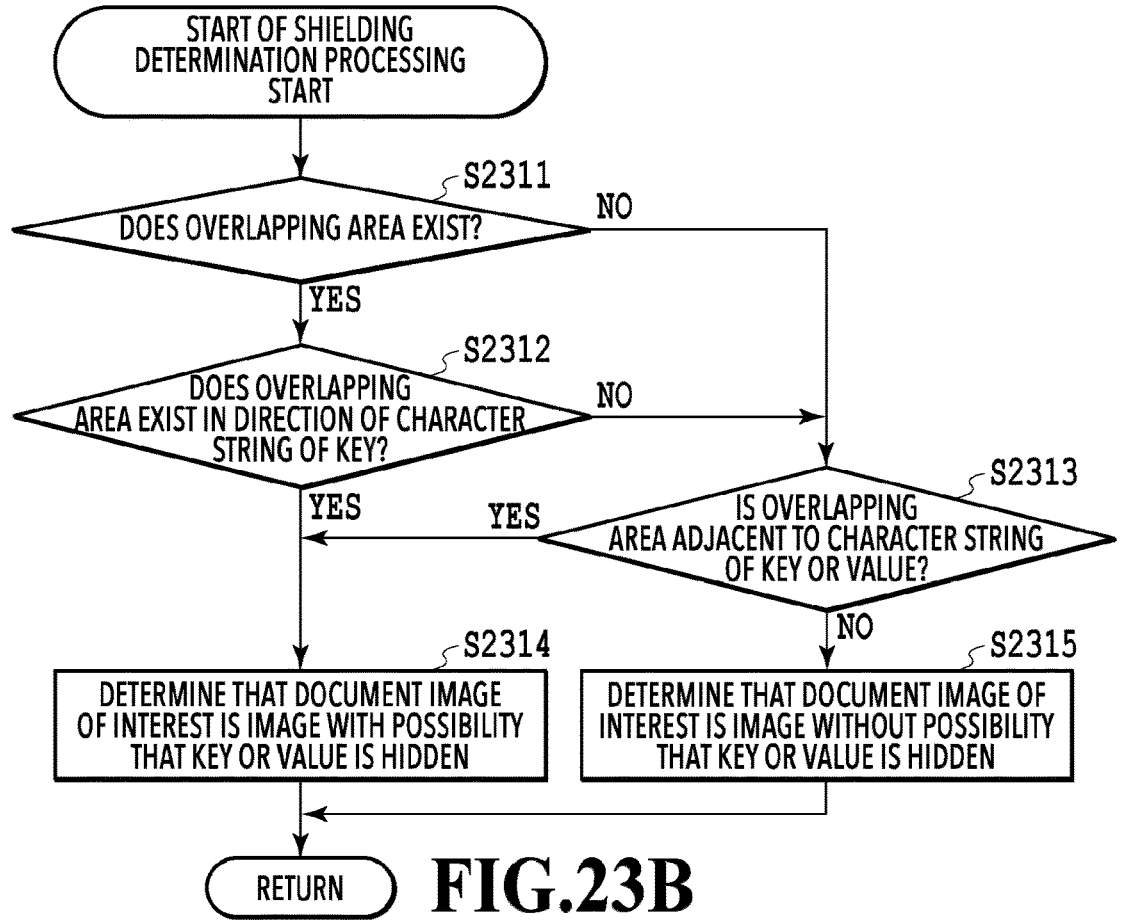

FIG. 23B is a flowchart showing details of the shielding determination processing according to the present embodiment. Explanation of the contents in common to those of the shielding determination processing (flowchart in FIG. 23A) according to the first embodiment is omitted or simplified and in the following, different points are explained mainly.

At S2311, as at S2301, among the plurality of document images obtained by the division, for the document image of interest, whether a document overlapping area exists is determined. In a case where an overlapping area exists, the processing advances to S2312 and in a case where no overlapping area exists, the processing advances to S2313.

At S2312, the OCR processing is performed for the processing-target document image, the character string of the key specified in advance is detected from the results thereof, and whether or not the document overlapping area exists in the direction of the arrangement of the characters of the detected character string of the key is determined. This determination focuses attention on the fact that many of the character strings of the value exist in the direction of the arrangement of the characters of the character string of the key. For example, in a case where the character string of the key is written from left to right and the document overlapping area exists on an extended line thereof, the possibility that the character string of the value corresponding to the key is hidden is determined to be strong. In a case where the document overlapping area exists in the direction of the arrangement of the characters of the character string of the key, the processing advances to S2314 and in a case where the overlapping area does not exist, the processing advances to S2313.

At S2313, the character string of the value corresponding to the key, which is detected at S2312, is further detected from the OCR results and whether the document overlapping area is adjacent to the area of the character string of the key or the value is determined. The reason is that in a case where the position at which the character string of the key or the value is detected and the document overlapping area are adjacent to each other, there is a possibility that a part of the character string of the key or the value is hidden by the document overlapping area. In a case where the document overlapping area is adjacent to the position of the character string of the key or the value, the processing advances to S2314 and in a case where the overlapping area is not adjacent to the position, the processing advances to S2315.

S2314 is the same as S2303 described previously and S2315 is the same as S2304. That is, the document image of interest is determined to be an image with a possibility that the key or the value is hidden by an overlap between documents. At this time, the data on the document image of interest is stored in the RAM 313 as the image data to be transmitted to the MFP 110 along with the error response. Further, at S2315, the document image of interest is determined to be an image without a possibility that the key or the value is hidden. Then, in a case where the processing such as this is completed for all the document images obtained by the image division, the processing returns to the flowchart in FIG. 21.

The above is the contents of the shielding determination processing according to the present embodiment. In the case of the present embodiment, by taking into consideration the positional relationship between the document overlapping area and the character string of the key or the value, it is possible to implement shielding determination processing with a higher accuracy.

Third Embodiment

For many of business forms, such as receipts and estimate forms, the format is standardized and the position of the key or the value is determined. Consequently, an aspect is explained as a third embodiment in which whether or not the key or the value is hidden is determined more accurately for a document whose format is known in advance by using the positional information on the character string corresponding to the key or the value.

Figure 24:
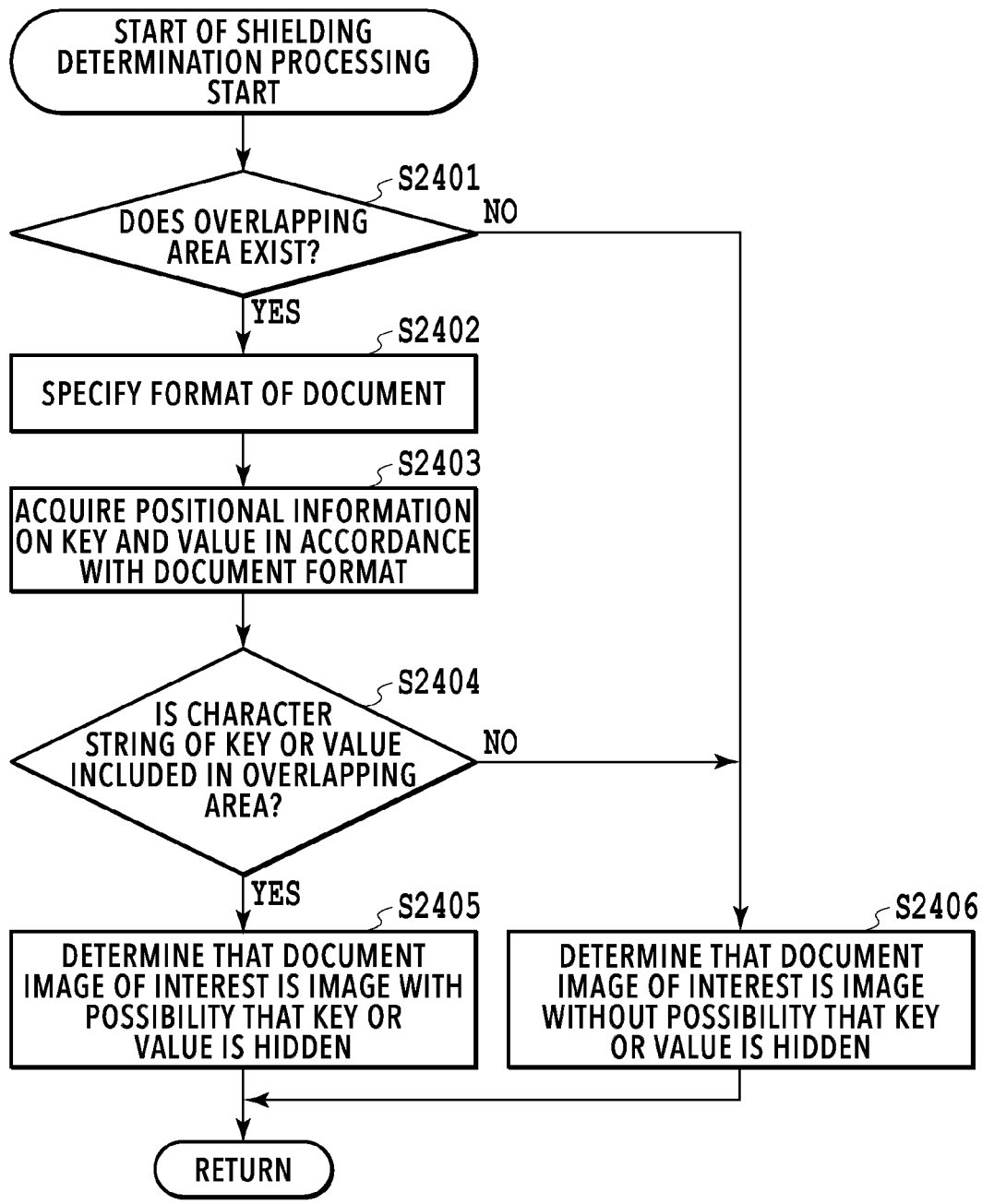
FIG. 24 is a flowchart showing details of shielding determination processing according to a third embodiment.

FIG. 24 is a flowchart showing details of the shielding determination processing according to the present embodiment. Explanation of the contents in common to those of the shielding determination processing according to the first and second embodiments is omitted or simplified and in the following, different points are explained mainly.

At S2401, as at S2301 in the flowchart in FIG. 23A according to the first embodiment, for the document image of interest among the plurality of document images obtained by the image division, whether a document overlapping area exists is determined. In a case where an overlapping area exists, the processing advances to S2402 and in a case where no overlapping area exists, the processing advances to S2406.

At S2402, the format of the document in the document image of interest is specified. It may be possible to specify the document format by applying a publicly known method. For example, feature information (information on the specific character string, the shape and arrangement of the logo, and the like) on the format of each of a plurality of kinds of document is stored in advance in the HDD 314 or the like. Then, it is possible to specify the format of the document image of interest by comparing the document image of interest with the feature information on the format of each document, which is stored in advance, by performing pattern matching for the document image of interest and so on.

At S2403, for the document format specified at S2402, the positional information (coordinate information indicating the position within the document and the like) on the character strings corresponding to the key and the value is acquired. It is sufficient to store the positional information on the character strings corresponding to the key and the value in the HDD 314 in advance in association with each document format. Alternatively, it may also be possible to add positional information about a new document format to the HDD 314, update the positional information about the existing document format and so on by performing learning each time the value information is extracted from the document image.

At S2404, by using the positional information on the key and the value, which is acquired at S2403, whether or not the character string corresponding to the key or the value is included in the document overlapping area (whether at least a part of the character string area overlaps the overlapping area) is determined. In a case where the character string corresponding to the key or the value is included in the document overlapping area, the processing advances to S2405 and in a case where the character string is not included in the overlapping area, the processing advances to S2406.

S2405 is the same as S2303 described previously and S2406 is the same as S2304. That is, at S2405, the document image of interest is determined to be an image with a possibility that the key or the value is hidden by an overlap between documents. At this time, the data on the document image of interest is stored in the RAM 313 as the image data to be transmitted to the MFP 110 along with the error response. Further, at S2406, the document image of interest is determined to be an image without a possibility that the key or the value is hidden. Then, in a case where the processing such as this is completed for all the document images obtained by the image division, the processing returns to the flowchart in FIG. 21.

The above is the contents of the shielding determination processing according to the present embodiment. According to the present embodiment, it is possible to further improve the determination accuracy of the shielding determination processing in a case where the format of a document is made clear.

Other Embodiments

Figure 25:
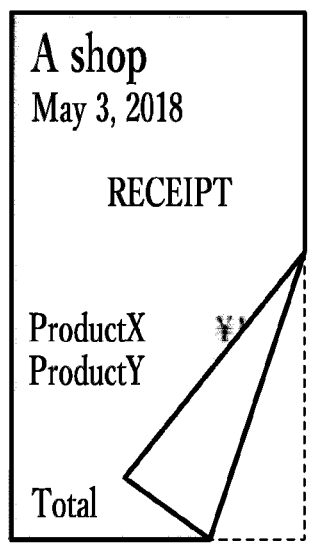
FIG. 25 is a diagram showing an example of a case where a character string corresponding to a value is hidden by a fold of a document.

In the first to third embodiments, the case is supposed where the key or the value is hidden by an overlap between documents, but there is also a case where the key or the value is hidden by a fold of a document. FIG. 25 is a diagram showing an example of a case where the character string corresponding to the value is hidden by a fold of the document. It is also possible to similarly apply the methods explained in the first to third embodiments to the fold such as this of a document. For example, in a case where the first embodiment is applied, for the document image obtained by the multi-cropping processing, whether the "folded area" as shown in FIG. 25 exits is determined. Then, it may be possible to apply the first embodiment by reading the "overlapping area" in the flowchart in FIG. 23 as the "folded area". It is possible to determine the presence/absence of the fold of a document at S2301 in this case based on, for example, whether the shape of the figure formed by the edges of the document image is a rectangle, or whether the angle formed by each side of the figure is the right angles. Then, at S2302, it is sufficient to determine whether the size of the "folded area" is larger than or equal to a predetermined size as in the case with the "overlapping area".

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, in a case where an image in units of documents, which is obtained by performing multi-cropping processing for a scanned image, and value information extracted from each image are registered in a database in association with each other, it is possible to prompt a user to perform a re-scan before registration on a condition that the situation requires a re-scan. Due to this, it is no longer necessary to scan the document again after registration, and therefore, the convenience of a user is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103759, filed Jun. 3, 2019 which is hereby incorporated by reference wherein in its entirety.

What is claimed is:

1. An apparatus comprising:
   at least one memory that stores a program; and
   at least one processor that executes the program to perform:
   (1) specifying document images corresponding to a plurality of documents from a scanned image generated by scanning the plurality of documents placed on a document table;
   (2) extracting at least one character string included in each of the specified document images, the extracted at least one character string including a character string specified as a key;
   (3) in a case where a first overlapping area that occurs by at least two documents overlapping each other during the scan exists in the specified document images, determining whether a position of the first overlapping area exists in a predetermined direction from a position of the character string specified as the key; and
   (4) outputting an error in a case where it is determined that the position of the first overlapping area exists in a predetermined direction from a position of the character string specified as the key,
   wherein the error is not outputted in a case where it is not determined that the position of the first overlapping area exists in a predetermined direction from a position of the character string specified as the key even if the first overlapping area exists.

2. The apparatus according to claim 1, wherein the specified document images corresponding to the plurality of documents are specified by performing multi-cropping processing for the scanned image and by further dividing a multi-cropped image into images in units of documents in a case where the multi-cropped image obtained by the multi-cropping processing is not an image in units of documents.

3. The apparatus according to claim 1,
   wherein the error is outputted in a case where the position of the first overlapping area is adjacent to the position of the character string specified as the key.

4. The apparatus according to claim 1, wherein the at least one processor executes the program to further perform specifying a format of a document corresponding to each of the specified document images, and
   wherein the at least one character string is extracted in accordance with the specified format.

5. The apparatus according to claim 1, wherein in a case where a second folding area that occurs by a document folding during the scan exists in the specified document images, the at least one processor further determines a second positional relationship between the second folding area and the extracted at least one character string, and further outputs an error in a case where the second positional relationship satisfies the predetermined condition, and
   wherein the error is not output in a case where the determined second positional relationship does not satisfy the predetermined condition even if the second folding area exists.

6. The apparatus according to claim 1, wherein the apparatus is connected with an external apparatus via a network,
   wherein the error is outputted to the external apparatus, and
   wherein the external apparatus displays a user interface screen which prompts a user to perform the scanning again.

7. The apparatus according to claim 1, wherein the at least one processor further controls to display a user interface screen which prompts a user to perform the scanning again in a case where the error is outputted.

8. An image processing method comprising:
   generating a scanned image by scanning a plurality of documents placed on a document table;
   specifying document images corresponding to the plurality of documents from the generated scanned image;
   extracting at least one character string included in each of the specified document images, the extracted at least one character string including a character string specified as a key;
   in a case where a first overlapping area that occurs by at least two documents overlapping each other during the scan exists in the specified document images, determining whether a position of the first overlapping area exists in a predetermined direction from a position of the character string specified as the key; and
   outputting an error in a case where it is determined that the position of the first overlapping area exits in a predetermined direction from a position of the character string specified as the key,
   wherein the error is not outputted in a case where it is not determined that the position of the first overlapping area exists in a predetermined direction from a position of the character string specified as the key even if the first overlapping area exists.

9. A non-transitory computer-readable storage medium storing a program for causing a computer to perform an image processing method comprising:
   generating a scanned image by scanning a plurality of documents placed on a document table;
   specifying document images corresponding to the plurality of documents from the generated scanned image;
   extracting at least one character string included in each of the specified document images, the extracted at least one character string including a character string specified as a key;
   in a case where a first overlapping area that occurs by at least two documents overlapping each other during the scan exists in the specified document images, determining whether a position of the first overlapping area exists in a predetermined direction from a position of the character string specified as the key; and
   outputting an error in a case where it is determined that the position of the first overlapping area exists in a predetermined direction from a position of the character string specified as the key,
   wherein the error is not outputted in a case where it is not determined that the position of the first overlapping area exists in a predetermined direction from a position of the character string specified as the key even if the first overlapping area exists.

* * * * *